(12) United States Patent
Rhee et al.

(10) Patent No.: US 7,809,116 B2
(45) Date of Patent: Oct. 5, 2010

(54) DSL SYSTEM ESTIMATION INCLUDING KNOWN DSL LINE SCANNING AND BAD SPLICE DETECTION CAPABILITY

(75) Inventors: Wonjong Rhee, Palo Alto, CA (US); Mark Harold Brady, Stanford, CA (US); John M. Cioffi, Atherton, CA (US)

(73) Assignee: Adaptive Spectrum and Signal Alignment, Inc., Redwood City, CA (US)

( * ) Notice: Subject to any disclaimer, the term of this patent is extended or adjusted under 35 U.S.C. 154(b) by 1249 days.

(21) Appl. No.: 11/069,159

(22) Filed: Mar. 1, 2005

(65) Prior Publication Data

US 2006/0098725 A1    May 11, 2006

Related U.S. Application Data

(63) Continuation-in-part of application No. 10/817,128, filed on Apr. 2, 2004, now Pat. No. 7,302,379.

(60) Provisional application No. 60/527,853, filed on Dec. 7, 2003.

(51) Int. Cl.
 H04M 1/24    (2006.01)
 H04M 3/08    (2006.01)
 H04M 3/22    (2006.01)

(52) U.S. Cl. .................... 379/1.04; 379/1.03; 379/30

(58) Field of Classification Search ................ 379/1.01, 379/1.03, 1.04, 22.03, 22.08, 23, 24, 27.08, 379/28, 29.09, 30; 370/241, 242, 252, 253; 375/221, 222, 224
See application file for complete search history.

(56) References Cited

U.S. PATENT DOCUMENTS 3,920,935 A    11/1975    Vierling et al.

(Continued)

FOREIGN PATENT DOCUMENTS

DE    10001150    7/2001

(Continued)

OTHER PUBLICATIONS

"International Search Report & Written Opinion", *International Application No. PCT/IB2004/003958*, (Jul. 20, 2005), 19 pgs.

(Continued)

*Primary Examiner*—Quoc D Tran
(74) *Attorney, Agent, or Firm*—Blakely, Sokoloff, Taylor & Zafman

(57) ABSTRACT

Estimates of a communication system configuration, such as a DSL system, are based on operational data collected from a network element management system, protocol, users and/or the like. The operational data collected from the system can include performance-characterizing operational data that typically is available in an ADSL system via element-management-system protocols. Scanning, wherein a number of line profiles are used in connection with DSL loops having known configurations, can be used to generate a database or library of loop configuration information. One or more of the line profiles can be used with an unknown DSL loop to generate operational data from the unknown DSL loop that is compared to the loop configuration information in the database, allowing identification of loop configuration information pertaining to the unknown DSL loop. The unknown DSL loop operational data also can be used to determine whether one or more bad splices are present on the unknown DSL loop and, in some cases, the approximate or exact bad splice(s) location(s).

15 Claims, 17 Drawing Sheets

U.S. PATENT DOCUMENTS

| | | | |
|---|---|---|---|
| 5,465,287 A | 11/1995 | Egozi | |
| 5,479,447 A | 12/1995 | Chow et al. | |
| 5,903,602 A | 5/1999 | Torkkel | |
| 5,999,540 A | 12/1999 | McGhee | |
| 6,058,162 A | 5/2000 | Nelson et al. | |
| 6,091,713 A | 7/2000 | Lechleider et al. | |
| 6,278,485 B1 | 8/2001 | Franchville et al. | |
| 6,311,144 B1 | 10/2001 | Abu El Ata | |
| 6,414,942 B1 | 7/2002 | Ito et al. | |
| 6,417,672 B1 | 7/2002 | Chong | |
| 6,453,016 B1 | 9/2002 | Chea, Jr. | |
| 6,456,694 B1 | 9/2002 | Posthuma | |
| 6,459,702 B1 | 10/2002 | Saaverda et al. | |
| 6,463,126 B1 | 10/2002 | Manica et al. | |
| 6,477,238 B1 | 11/2002 | Schneider et al. | |
| 6,510,184 B1 | 1/2003 | Okamura | |
| 6,534,996 B1 | 3/2003 | Amrany et al. | |
| 6,574,308 B1 | 6/2003 | Macdonald et al. | |
| 6,625,255 B1 | 9/2003 | Green et al. | |
| 6,658,052 B2 | 12/2003 | Krinsky et al. | |
| 6,801,601 B2 | 10/2004 | Kamali et al. | |
| 6,819,746 B1 * | 11/2004 | Schneider et al. | 379/29.01 |
| 6,829,330 B2 * | 12/2004 | Belge et al. | 379/22.04 |
| 6,856,936 B1 | 2/2005 | Chen et al. | |
| 6,870,901 B1 | 3/2005 | Shah et al. | |
| 6,895,081 B1 | 5/2005 | Schmidt et al. | |
| 6,970,415 B1 | 11/2005 | Galarza et al. | |
| 6,970,560 B1 | 11/2005 | Hench et al. | |
| 6,990,196 B2 | 1/2006 | Zeng et al. | |
| 7,068,755 B2 | 6/2006 | Qiu | |
| 7,216,268 B2 | 5/2007 | Ryckebusch et al. | |
| 7,272,209 B2 * | 9/2007 | Jiang et al. | 379/1.04 |
| 2001/0043647 A1 | 11/2001 | Belge | |
| 2002/0067802 A1 | 6/2002 | Smith et al. | |
| 2002/0075952 A1 | 6/2002 | Verbin et al. | |
| 2002/0114383 A1 | 8/2002 | Belge et al. | |
| 2002/0131537 A1 | 9/2002 | Storm et al. | |
| 2002/0172329 A1 | 11/2002 | Rashid-Farrokhi et al. | |
| 2002/0176544 A1 | 11/2002 | Liu et al. | |
| 2003/0002658 A1 | 1/2003 | Belge et al. | |
| 2003/0007605 A1 * | 1/2003 | Rosen et al. | 379/1.04 |
| 2003/0026391 A1 | 2/2003 | Kamali et al. | |
| 2003/0086514 A1 | 5/2003 | Ginis et al. | |
| 2004/0086085 A1 | 5/2004 | Nordling et al. | |
| 2004/0095921 A1 | 5/2004 | Kerpez | |
| 2004/0120470 A1 | 6/2004 | Cambron et al. | |
| 2004/0258000 A1 | 12/2004 | Kamali et al. | |
| 2004/0264685 A1 | 12/2004 | Smith et al. | |
| 2005/0026572 A1 | 2/2005 | Dasgupta et al. | |
| 2005/0088267 A1 | 4/2005 | Watts et al. | |
| 2005/0123027 A1 | 6/2005 | Cioffi et al. | |
| 2005/0123030 A1 | 6/2005 | Belge | |
| 2005/0135566 A1 | 6/2005 | Schmidt et al. | |
| 2005/0213714 A1 | 9/2005 | Langberg et al. | |
| 2006/0159162 A1 | 7/2006 | Shrikhande et al. | |
| 2006/0164101 A1 | 7/2006 | Fossion et al. | |
| 2006/0182169 A1 | 8/2006 | Belge et al. | |
| 2006/0291500 A1 | 12/2006 | Kroninger et al. | |
| 2007/0074513 A1 | 4/2007 | Lamb et al. | |
| 2007/0133787 A1 | 6/2007 | Verlinden et al. | |

FOREIGN PATENT DOCUMENTS

| | | |
|---|---|---|
| EP | 0695100 | 1/1996 |
| EP | 1009135 | 6/2000 |
| EP | 1 073 247 A2 | 1/2001 |
| EP | 1213669 | 6/2002 |
| GB | 1382087 | 1/1975 |
| GB | 2173974 | 10/1986 |
| WO | WO 00/64132 A2 | 10/2000 |
| WO | WO 01/35607 A1 | 5/2001 |
| WO | WO-2001/033823 | 5/2001 |
| WO | WO-2001/035611 | 5/2001 |
| WO | WO-2001/035614 | 5/2001 |
| WO | WO-2002/003152 | 1/2002 |
| WO | WO-2002/005529 | 1/2002 |
| WO | WO-2002/013009 | 2/2002 |
| WO | WO-2002/013405 | 2/2002 |
| WO | WO-2003/005598 | 1/2003 |
| WO | WO-2006/089888 | 8/2006 |
| WO | WO-2006/092730 | 9/2006 |
| WO | WO-2007/012867 | 2/2007 |
| WO | WO-2007/098422 | 8/2007 |
| WO | WO-2007/103791 | 9/2007 |

OTHER PUBLICATIONS

"ITU-T Recommendation G.993.2", *International Telecommunication Union*, Study Group 15, TD 168 (PLEN/15), (May 16-27, 2005), pp. 1-14, 84-94 and 158-161.

Cioffi, John M., et al., "Channel Identification with Dynamic Spectrum Management", *ANSI Contribution T1E1.4/2001-147*, (May 7, 2001), 8 pgs.

European Patent Office, "Office Action", *European Application No. 04801291.8-2416 (8241P003EP)*, (Jul. 31, 2007) 4.

Jungwon, Lee et al., "A Multiuser-User Rate and Power Control Algorithm for VDSL", *GLOBECOM '02. Nov. 17-21, 2002. vol. 2.*, pp. 1264-1268.

Palomar, D.P., et al., "Optimum Joint Transmit-Receive Linear Processing for Vectored DSL Transmission with QoS Requirements", *36th Asilomar Conf. on Signals, Systems and Computers.* Nov. 3-6, 2002. vol. 1, pp. 388-392.

Starr, et al., "DSL Advances", *Chapters 3, 7, and 11; Prentice- Hall*, (2003).

USPTO, "Notice of Allowance", *U.S. Appl. No. 10/817,128*, (Jul. 23, 2007), 7.

USPTO, "Office Action", *U.S. Appl. No. 11/817,128*, (Oct. 31, 2006), 17.

USPTO, "Office Action", *U.S. Appl. No. 10/817,128*, (Apr. 19, 2007), 11.

Zeng, Chaohuang, et al., "Crosstalk Identification in xDSL Systems", *IEEE Journal on Selected Areas in Communications*, Aug. 2001. vol. 19, Issue 8, pp. 1488-1496.

European Patent Office, "First Office Action", European Application No. 06710513.0, 4 pgs.

IP Australia, "First Official Report", Australian Patent Application No. 2004298117, (Dec. 1, 2008), 2 pgs.

Patent Cooperation Treaty, "International Search Report and Written Opinion", International Application No. US2006/026795,, (Aug. 27, 2007), 10 pgs.

State Intellectual Property, Office of P.R. China, "Notification of the First Office Action", Chinese Application No. 200480041373.8,, (Apr. 4, 2008)—translation 14 pgs.

Non-Final Office Action for U.S. Appl. No. 11/945,210, mailed May 11, 2009, 17 pages.

Office Action for Chinese Patent Application No. 200680027968.7, with translation, mailed May 8, 2009, 11 pages.

International Search Report & Written Opinion, International Application No. PCT/IB2006/000496, mailed Jun. 19, 2006, 10 pages.

Aldana, Carlos, "Interference Estimation for Multicarrier Systems," Doctoral Thesis, Stanford University, Jun. 2002, 137 pages.

Notice of Allowance for U.S. Appl. No. 11/945,210 , Mailed Nov. 19, 2009, 9 Pages.

Office Action for Chinese Patent Application No. 200680006774.9, mailed Jan. 29, 2010, 10 pages.

Non-Final Office Action for U.S. Appl. No. 11/995,194, Mailed Feb. 17, 2010, 27 Pages.

Office Action for Chinese Patent Application No. 200680027968.7 Mailed 02/05/10, 18 Pages.

IP Australia, Notice of Acceptance Mailed 2/24/10 Whole Document.

* cited by examiner

1302 -- Hlog estimates (ABCD model) (y-axis loss in dB; x-axis tone number)

1304 -- Reported insertion loss (y-axis loss in dB; x-axis tone number)

1306 -- $H_{smooth}$ (y-axis loss in dB; x-axis tone number)

1308 -- $H_{verysmooth}$ (y-axis loss in dB; x-axis tone number)

| Loop Configurations | Length of Loop (ft) | 3000 | 3000 | 3000 | 3000 | ... | 3000 | 3000 | ... | 15000 |
|---|---|---|---|---|---|---|---|---|---|---|
| | Length of Bridge Tap 1 (ft) | 0 | 100 | 200 | 300 | ... | 2000 | 100 | ... | 2000 |
| | Length of Bridge Tap 2 (ft) | 0 | 0 | 0 | 0 | ... | 0 | 100 | ... | 2000 |
| Measured upstream attenuation with line profile 1 | | 12 | 12 | 12 | 12 | ... | 14 | 12 | ... | 56 |
| Measured upstream attenuation with line profile 2 | | 14 | 14 | 15 | 15 | ... | 16 | 14 | ... | 58 |
| Measured downstream attenuation with line profile 1 | | 20 | 20 | 20 | 21 | ... | 23 | 20 | ... | 61 |
| Measured downstream attenuation with line profile 2 | | 23 | 24 | 24 | 24 | ... | 26 | 22 | ... | 61 |

*Figure 14*

DSL SYSTEM ESTIMATION INCLUDING KNOWN DSL LINE SCANNING AND BAD SPLICE DETECTION CAPABILITY

CROSS-REFERENCE TO RELATED APPLICATIONS

This application is a continuation-in-part of U.S. Ser. No. 10/817,128 filed on Apr. 2, 2004 now U.S. Pat. No. 7,302,379, entitled DSL SYSTEM ESTIMATION AND PARAMETER RECOMMENDATION, which claims the benefit of priority under 35 U.S.C. §119(e) of U.S. Provisional No. 60/527,853 filed on Dec. 7, 2003, entitled DYNAMIC MANAGEMENT OF COMMUNICATION SYSTEM, the disclosures of which are incorporated herein by reference in their entirety for all purposes.

This application is related to U.S. Ser. No. 10/981,068 filed on Nov. 4, 2004, entitled COMMUNICATION DEVICE IDENTIFICATION, the disclosure of which is incorporated herein by reference in its entirety for all purposes.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable.

BACKGROUND OF THE INVENTION

1. Field of the Invention

This invention relates generally to methods, systems and apparatus for managing digital communications systems. More specifically, this invention relates to estimating the configuration of a group of channels or lines in a communication system such as a DSL system.

2. Description of Related Art

Digital subscriber line (DSL) technologies provide potentially large bandwidth for digital communication over existing telephone subscriber lines (referred to as loops and/or the copper plant). Telephone subscriber lines can provide this bandwidth despite their original design for only voice-band analog communication. In particular, asymmetric DSL (ADSL) can adjust to the characteristics of the subscriber line by using a discrete multitone (DMT) line code that assigns a number of bits to each tone (or sub-carrier), which can be adjusted to channel conditions as determined during training and initialization of the modems (typically transceivers that function as both transmitters and receivers) at each end of the subscriber line.

"xDSL" and "DSL" are terms used to generally refer to digital subscriber line equipment and services, including packet-based architectures, such as ADSL, HDSL, SDSL, SHDSL, IDSL VDSL and RADSL. DSL technologies can provide extremely high bandwidth over embedded twisted pair, copper cable plant. DSL technologies offer great potential for bandwidth-intensive applications.

ADSL or asymmetric digital subscriber line services generally use existing unshielded twisted pair copper wires from a telephone company's central office (CO) to a subscriber's premise. ADSL modems at both the CO and remote locations send high-speed digital signals over the copper wires and may be capable of providing a downstream bandwidth of about 1.5 Mbps-6.144 Mbps (8 Mbps in ADSL1 and used in Japan and China already), and an upstream bandwidth of about 32 Kbps-640 Kbps with loop distances ranging to 5.5 km.

HDSL or high bit rate DSL provides a symmetric, high-performance connection over a shorter loop, typically requires two or three copper twisted pairs, and is capable of providing both upstream and downstream bandwidth of about 1.5 Mbps over loop distances of up to about 3.7 km. SDSL or single line DSL provides a symmetric connection that matches HDSL data rates using a single twisted pair, but operates over a shorter loop of up to about 3.0 km. VDSL or very high bit rate DSL typically is implemented in asymmetric form, as a very high speed variation of ADSL over a very short loop. Specifically, target downstream performance is typically about 52 Mbps over local loops of 300 m, 26 Mbps at 1,000 m, and 13 Mbps at 1,500 m. Upstream data rates in asymmetric implementations tend to range from about 1.6 Mbps to about 2.3 Mbps. VDSL also offers symmetric data rates of typically 10-25 Mbps. Newer versions of VDSL known as VDSL2 promise symmetric data rates of 100 Mbps and downstream rates to 150 Mbps in asymmetric configurations. Additionally, there are a small number of nonstandard RADSLs or rate adaptive asymmetric DSLS, which, like ADSL, provide a dynamic data rate that adapts to the length and quality of the line (and used a line transmission method that is now nearly defunct in DSL called QAM or CAP). These versions of DSL utilize a packet-based approach that does away with the line-grabbing practice of circuit switched networks. This packet-based approach works well in a variety of situations.

DSL services are much more dependent on line conditions (for example, the length, quality and environment of the copper loop) than traditional telephone services, which typically use a bandwidth including frequencies up to about 4 kilohertz compared to DSL services which utilize a bandwidth including frequencies sometimes over 1 MHz. While some local loops are in great condition for implementing DSL (for example, having short to moderate lengths with minimal bridged taps and splices) many local loops are not as suitable. For example, local loop length varies widely. Moreover, the wire gauge for a local loop may not be consistent over the length of the loop, having two or more different gauges spliced together. Still further, many existing local loops have one or more bridged taps (a length of wire pair that is connected to a loop at one end and is unconnected or poorly terminated at the other end), and some local loops have bad splices (for example, a splice that is loosely connected). This type of line information (for example, wire gauge information, bridged-tap information, segment information, bad splice information and load coil information) is important to the evaluation of DSL systems and configurations. Another important class of line conditions is the noise measured on the line, which can be caused by radiation from other DSLs ("crosstalk"), radio ingress of AM or amateur radio stations, thermal noises in the line or receiver analog components, various appliances at the home, electronic equipment in the loop plant or at the central office. These types of noises can vary from time to time and be relatively stationary, impulsive or a combination of both. This type of information also can be important for the evaluation of DSL systems and configurations.

The different conditions and configurations of these loops, including how they are arranged and operated within bundles or binders from the telephone company CO and other locations, mean that every group of DSL loops is different and thus behaves differently. Information may exist about individual lines, or can be determined using earlier techniques (for example, evaluation using voice-band measurement and loop-qualification methods). However, this information fails to take into account the interaction among lines (active and inactive), including interactions such as crosstalk (that is, unwanted interference and/or signal noise passed between adjacent lines that occurs because of coupling between wire pairs when wire pairs in the same or a nearby bundle are used for separate signal transmission). Moreover, the accuracy of some of this information is questionable; it has been found that line quality varies widely, even among lines in the same group. Further, voice-band measurements do not always accurately reflect the DSL environment of loops. Therefore, techniques that evaluate a single line in each binder or other group, for example, and then extrapolate that information to all other lines in such a group, may not provide accurate information about those other lines or even the evaluated line itself.

Other techniques include characterizing DSL transmission lines using time-domain reflectometry, in which a predetermined test signal is sent from a point of origin to a DSL transmission line, the line reflects a portion of the signal back to the point of origin, and the reflected signal is analyzed to determine transmission-line characteristics. In other situations, a reference loop might be analyzed and/or characterized to generate a transfer function and to model the effects of attenuation, noise, etc. on signals in the reference loop. Typically, one reference loop is selected in each binder or other group of lines and evaluated.

However, these techniques for evaluating a single loop or line do fail to take into account the environmental operation of these lines. That is, there are environmental conditions that affect line performance beyond the behavior of the line alone. Testing a single reference loop may develop some basic information about the line itself, but such information does not assist in the understanding and implementation of optimized services to many users who are using the grouped lines contemporaneously.

Another problem with the testing, monitoring, and maintenance required for successful DSL deployment is the fact that different parties frequently use and operate adjoining DSL lines. For example, some lines in a CO might be operated by an ILEC (Incumbent Local Exchange Carrier), which utilizes its own operational and usage rules and systems. Other lines in the same binders and/or other groupings might be operated by one or more CLECs (Competitive Local Exchange Carrier), which are in direct competition with the ILECs in the marketplace, and which likewise have their own operational and usage rules and systems. The exclusionary and competitive nature of these situations, and others like them, mean that there is little opportunity to obtain specific information about the DSL line environment.

Systems, methods and techniques that permit modeling of DSL systems, including DSL binders and other groups, would represent a significant advancement in the art. In particular, management systems may provide only limited information nominally on the line and a system that could infer substantially more information from that limited information would represent a considerable advancement in the field of DSL service rates and associated ranges.

BRIEF SUMMARY OF THE INVENTION

Estimates of a given xDSL system configuration are based on operational data collected from a network element management system, protocol, users and/or the like. To enhance the accuracy of estimates, diverse operational data may be collected by selecting various operational modes (that is, by scanning). Using a generated estimate, an estimator and/or controller (such as a dynamic spectrum manager) may then control (or recommend) one or more operational modes for users and/or other parts of the communication system, for example by setting users' data rates, transmit power levels, signal transmission frequency band, etc. The approximation or estimate obtained using the present invention is valuable for various purposes, including but not limited to, assisting users in optimizing their use of the system or detecting lines whose performance can be significantly improved with minimal change of line configuration or operational mode. The operational data collected from the system can include performance-characterizing operational data that typically is available in an ADSL system via element-management-system protocols. The estimator and/or controller can perform the methods and implement the present invention in various ways.

The estimator, controller and/or other components can be a computer-implemented device or combination of devices that collect and analyze appropriate operational data. Generated estimates can be used in evaluating system performance and directly or indirectly dictating/requiring changes or recommending improvements in operation by transmitters operating on the system. The controller and/or estimator can be located anywhere, residing in some cases in the DSL CO, while in other cases they may be operated by a third party located outside the CO.

Data may be obtained from the communication system via available means, including for example data and/or information described by the G.997.1 (G.ploam) standard and the like. Data and/or other information may be collected using techniques internal to a given communication system or may be obtained from system elements and components via email and/or other "external" means.

The estimator and/or controller may be an ILEC or CLEC operating a number of DSL lines from a CO or other location. Collecting means acquires the available operational data and provides this data to estimating means that may be coupled to an operating mode instruction signal generating means in the controller. This signal generator may be configured to generate and send operating mode instruction signals to users and/ or other parts of the communication system (for example, ADSL transceivers). These instructions may include acceptable data rates, transmit power levels, coding and latency requirements, etc. The system configuration sought to be approximated can include the number of users, the number of lines (active and/or inactive), operational characteristics of the system, etc. Data may be collected once or over time, for example on a periodic basis, an on-demand basis or any other non-periodic basis, thus allowing the estimator to update its system configuration approximation, if desired.

Methods according to the present invention can be performed by a controller, estimator, dynamic spectrum manager, computer, etc. One or more initial models may be selected. These models may be parameterizable and might be based on or include the channel insertion-loss transfer function for a known or parameterized length (and any known or parameterized bridged-tap lengths and positions), any inferred or operational data regarding individual users' power levels and/or their corresponding PSD levels, the bit error or time-averaged versions of errors (such as errored seconds and/or code violations with time), their corresponding code settings and/or the parameterized shaped PSDs of potential noises. Models may also be selected at a later time in the process.

Data is collected from available sources (for example, "internally" with TL1 commands, SNMP, XMP or other protocols or "externally" over the internet). The collected data is evaluated and compared to the model(s) currently under consideration. If an initial model or group of potential models was not selected before data was collected, then one or more models may be selected after initial data collection. The model(s) may then be refined, modified, discarded and/or new models selected, depending on the results of the evaluation. A history of collected data over time may be mined to refine the choice and alteration or adjustment of one or more models. Where the estimator achieves a suitable estimate of the system configuration, the estimator or controller then can send recommendations, instructions or other communications to transceivers, users and/or other parts of the communication system. These instructions may be requirements for operational modes or may be recommendations for improving performance and/or services for that user. Such instructions may concern setting data rates, transmit power levels, spectral shaping and composition, etc. and may request or command that additional excitations of the line (perhaps under different data conditions such as different data rates, different start/ minimum and/or end/maximum frequencies in DMT and/or different PSD or power levels) that might allow better match to existing or conjectured models in the estimator.

The likelihood of a model's accuracy (determined, for example, by a maximum likelihood methodology) can be based on various data, information and/or indicators of system performance, such as observed normal operational data (generated by users' "normal" use of the system) that shows operating performance based on normal operation signals, and/or test data (generated by testing normally conducted on the system) that shows operating performance, and/or prompted operational data (generated by stimulating the xDSL system) that shows operating performance based on stimulation signals.

One example of such prompted data uses frequency carrier masks to approximate the Hlog of a given set of frequencies. Information regarding bridged taps, attenuation, etc. can be determined from such information.

In other embodiments, scanning is used wherein a number of line profiles are used in connection with DSL loops having known configurations, so that a database or library of loop configuration information can be assembled. One or more of the line profiles can then be used with an unknown DSL loop to generate operational data that can be collected from the unknown DSL loop. This collected operational data is compared to the loop configuration information in the database, allowing identification of loop configuration information pertaining to the unknown DSL loop. Various ways of estimating the configuration of the unknown DSL loop can be used. Moreover, the operational data collected from the unknown DSL loop may also be used to determine whether one or more bad splices are present on the unknown DSL loop and, in some cases, the approximate or exact bad splice(s) location(s).

Further details and advantages of the invention are provided in the following Detailed Description and the associated Figures.

BRIEF DESCRIPTION OF THE SEVERAL VIEWS OF THE DRAWING

The present invention will be readily understood by the following detailed description in conjunction with the accompanying drawings, wherein like reference numerals designate like structural elements, and in which:

FIG. 14 is an example of a database or library usable with embodiments of the present invention in connection with building a database from the use of scanning profiles for a communication system.

DETAILED DESCRIPTION OF THE INVENTION

Figure 1:
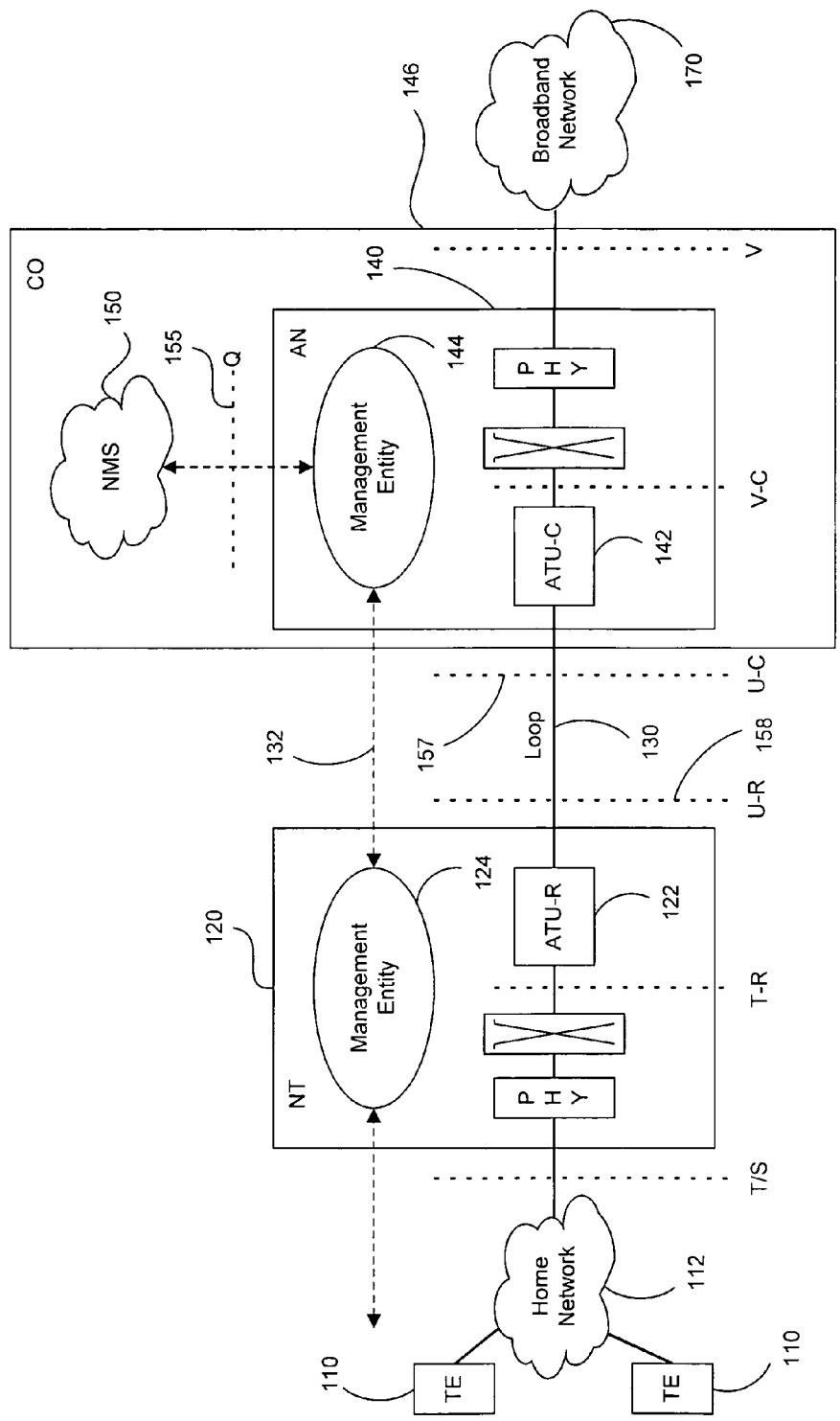
FIG. 1 is a schematic block reference model system according to the G.997.1 standard.

The following detailed description of the invention will refer to one or more embodiments of the invention, but is not limited to such embodiments. Rather, the detailed description is intended only to be illustrative. Those skilled in the art will readily appreciate that the detailed description given herein with respect to the Figures is provided for explanatory purposes as the invention extends beyond these limited embodiments.

Embodiments of the present invention estimate the configuration of a given xDSL system based on operational data collected from a network element management system, protocol or the like. Using an estimate thusly generated, a controller then controls the operational mode (or may recommend a mode), for example by setting users' data rates, transmit power levels, etc. While the exact configuration of the xDSL system may not be determinable, the approximation or estimate obtained using the present invention is nevertheless extremely valuable for various purposes, including but not limited to, assisting users in optimizing their use of the system or detecting lines whose performance can be significantly improved with minimal change of line configuration. The operational data collected from the system can include performance-characterizing operational data that typically is available in an ADSL system via element-management-system protocols. The operational data also may include data not typically included in the ADSL system. That data may come from certain modem models and/or other sources and may thus be used for channel identification and/or other purposes. An estimator and/or controller (for example, a dynamic spectrum manager or other independent entity) can perform the methods and implement the present invention in various ways.

As described in more detail below, an estimator implementing one or more embodiments of the present invention can be part of a controller (for example, a dynamic spectrum manager or spectrum management center). These components can be a computer-implemented device or combination of devices that collect and analyze appropriate operational data. Generated estimates can be used in evaluating system performance and directly or indirectly dictating/requiring changes or recommending improvements in operation by transmitters operating on the system. The controller and/or estimator can be located anywhere. In some embodiments, the controller and/or estimator reside in the DSL CO, while in other cases they may be operated by a third party located outside the CO. The structure, programming and other specific features of a controller and/or estimator usable in connection with embodiments of the present invention will be apparent to those skilled in the art after reviewing the present disclosure.

The following examples of embodiments of the present invention will use ADSL systems as exemplary communications systems. Within these ADSL systems, certain conventions, rules, protocols, etc. may be used to describe operation of the exemplary ADSL system and the information and/or data available from users and/or equipment on the system. However, as will be appreciated by those skilled in the art, embodiments of the present invention may be applied to various communications systems, and the invention is not limited to any particular system. The present invention can be used in any data transmission system for which knowledge of the system configuration would be valuable.

Various network management elements are used for management of ADSL physical-layer resources, where elements refer to parameters or functions within an ADSL modem pair, either collectively or at an individual end. A network management framework consists of one or more managed nodes, each containing an agent. The managed node could be a router, bridge, switch, ADSL modem or other. At least one NMS (Network Management System), which is often called the manager, monitors and controls managed nodes and is usually based on a common PC or other computer. A network management protocol is used by the manager and agents to exchange management information and data. The unit of management information is an object. A collection of related objects is defined as a Management Information Base (MIB).

FIG. 1 shows the reference model system according to the G.997.1 standard (G.ploam), which is incorporated herein in its entirety by reference for all purposes. This model applies to all ADSL systems meeting the various standards that may or may not include splitters, such as ADSL1 (G.992.1), ADSL-Lite (G.992.2), ADSL2 (G.992.3), ADSL2-Lite G.992.4, ADSL2+(G.992.5) and the G.993.x emerging VDSL standards, as well as the G.991.1 and G.991.2 SHDSL standards, all with and without bonding. This model is well known to those skilled in the art.

The G.997.1 standard specifies the physical layer management for ADSL transmission systems based on the clear embedded operation channel (EOC) defined in G.997.1 and use of indicator bits and EOC messages defined in G.992.x standards. Moreover, G.997.1 specifies network management elements content for configuration, fault and performance management. In performing these functions, the system utilizes a variety of operational data that is available at an access node (AN).

In FIG. 1, users' terminal equipment 110 is coupled to a home network 112, which in turn is coupled to a network termination unit (NT) 120. NT 120 includes an ATU-R 122 (for example, a transceiver defined by one of the ADSL standards) or any other suitable network termination modem, transceiver or other communication unit. NT 120 also includes a management entity (ME) 124. ME 124 can be any suitable hardware device, such as a microprocessor, microcontroller, or circuit state machine in firmware or hardware, capable of performing as required by any applicable standards and/or other criteria. ME 124 collects and stores performance and/or operational data in its MIB, which is a database of information maintained by each ME, and which can be accessed via network management protocols such as SNMP (Simple Network Management Protocol), an administration protocol used to gather information from a network device to provide to an administrator console/program or via TL1 commands, TL1 being a long-established command language used to program responses and commands between telecommunication network elements.

Each ATU-R in a system is coupled to an ATU-C in a CO or other central location. In FIG. 1, ATU-C 142 is located at an access node (AN) 140 in a CO 146. An ME 144 likewise maintains an MIB of performance data pertaining to ATU-C 142. The AN 140 may be coupled to a broadband network 170 or other network, as will be appreciated by those skilled in the art. ATU-R 122 and ATU-C 142 are coupled together by a loop 130, which in the case of ADSL typically is a telephone twisted pair that also carries other communication services.

Several of the interfaces shown in FIG. 1 are used for determining and collecting performance data. The Q-interface 155 provides the interface between the NMS 150 of the operator and ME 144 in AN 140. All of the parameters specified in the G.997.1 standard apply at the Q-interface 155. The near-end parameters supported in ME 144 are derived from ATU-C 142, while the far-end parameters from ATU-R 122 can be derived by either of two interfaces over the U-interface. Indicator bits and EOC messages, which are sent using embedded channel 132 and are provided at the PMD layer, can be used to generate the required ATU-R 122 parameters in ME 144. Alternately, the OAM channel and a suitable protocol can be used to retrieve the parameters from ATU-R 122 when requested by ME 144. Similarly, the far-end parameters from ATU-C 142 can be derived by either of two interfaces over the U-interface. Indicator bits and EOC messages, which are provided at the PMD layer, can be used to generate the required ATU-C 142 parameters in ME 122 of NT 120. Alternately, the OAM channel and a suitable protocol can be used to retrieve the parameters from ATU-C 142 when requested by ME 124.

At the U-interface (which is essentially loop 130), there are two management interfaces, one at ATU-C 142 (the U-C interface 157) and one at ATU-R 122 (the U-R interface 158). Interface 157 provides ATU-C near-end parameters for ATU-R 122 to retrieve over the U-interface 130. Similarly, interface 158 provides ATU-R near-end parameters for ATU-C 142 to retrieve over the U-interface 130. The parameters that apply may be dependent upon the transceiver standard being used (for example, G.992.1 or G.992.2).

The G.997.1 standard specifies an optional OAM communication channel across the U-interface. If this channel is implemented, ATU-C and ATU-R pairs may use it for transporting physical layer OAM messages. Thus, the transceivers 122, 142 of such a system share various operational and performance data maintained in their respective MIBs.

More information can be found regarding ADSL NMSs in Technical Report TR-005, entitled "ADSL Network Element Management" from the ADSL Forum, dated March 1998, which is incorporated herein by reference in its entirety for all purposes. Also, Working Text WT-87 (Rev. 6), entitled "CPE WAN Management Protocol" from the DSL Forum, dated January 2004 is incorporated herein by reference in its entirety for all purposes. Finally, Working Text WT-082v7, entitled "LAN-Side DSL CPE Configuration Specification" from the DSL Forum, dated Jan. 5, 2004 is incorporated herein by reference in its entirety for all purposes. These documents address different situations for CPE side management.

As will be appreciated by those skilled in the art, at least some of the parameters described in these documents can be used in connection with embodiments of the present invention. Moreover, at least some of the system descriptions are likewise applicable to embodiments of the present invention. Various types of operational data and information available from an ADSL NMS can be found therein; others may be known to those skilled in the art.

In a typical topology of a DSL plant, in which a number of transceiver pairs are operating and/or available, part of each subscriber loop is collocated with the loops of other users within a multi-pair binder (or bundle). After the pedestal, very close to the Customer Premises Equipment (CPE), the loop takes the form of a drop wire and exits the bundle. Therefore, the subscriber loop traverses two different environments. Part of the loop may be located inside a binder, where the loop is sometimes shielded from external electromagnetic interference, but is subject to crosstalk. After the pedestal, the drop wire is often unaffected by crosstalk due to its being far from other pairs for most of the drop, but transmission can also be more significantly impaired by electromagnetic interference because the drop wires are unshielded. Many drops have 2 to 8 twisted-pairs within them and in situations of multiple services to a home or bonding (multiplexing and demultiplexing of a single service) of those lines, additional substantial crosstalk can occur between these lines in the drop segment.

Figure 2:
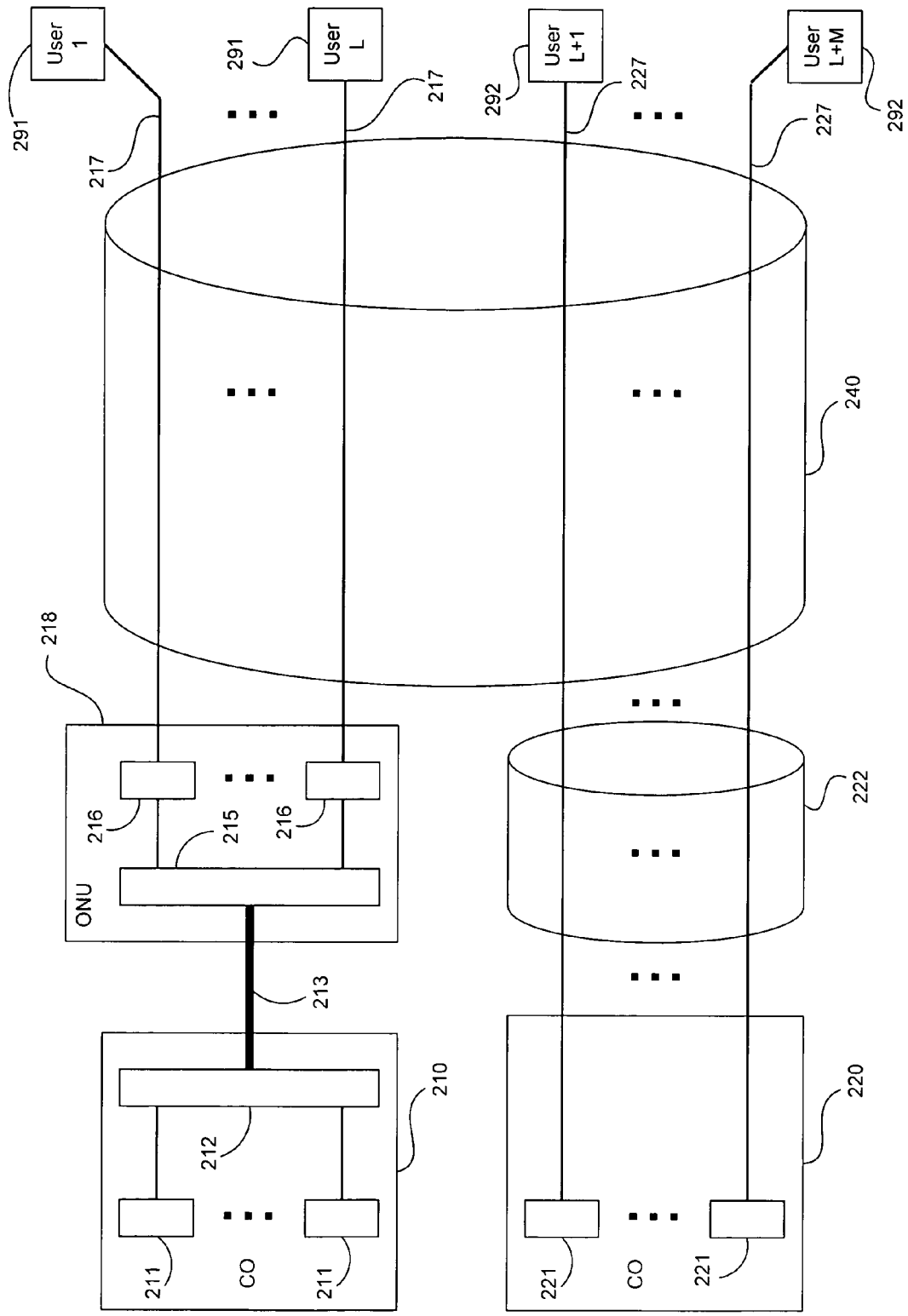
FIG. 2 is a schematic block diagram illustrating a generic, exemplary DSL deployment.

A generic, exemplary DSL deployment scenario is shown in FIG. 2. All the subscriber loops of a total of (L+M) users 291, 292 pass through at least one common binder. Each user is connected to a Central Office 210, 220 through a dedicated line. However, each subscriber loop may be passing through different environments and mediums. In FIG. 2, L users 291 are connected to CO 210 using a combination of optical fiber 213 and twisted copper pairs 217, which is commonly referred to as Fiber to the Cabinet (FTTCab) or Fiber to the Curb. Signals from transceivers 211 in CO 210 have their signals converted by optical line terminal 212 and optical network terminal 215 in CO 210 and optical network unit (ONU) 218. Modems 216 in ONU 218 act as transceivers for signals between the ONU 218 and users 291.

The loops 227 of the remaining M users 292 are copper twisted pairs only, a scenario referred to as Fiber to the Exchange (FTTEx). Whenever possible and economically feasible, FTTCab is preferable to FTTEx, since this reduces the length of the copper part of the subscriber loop, and consequently increases the achievable rates. The existence of FTTCab loops can create problems to FTTEx loops. Moreover, FTTCab is expected to become an increasingly popular topology in the future. This type of topology can lead to substantial crosstalk interference and may mean that the lines of the various users have different data carrying and performance capabilities due to the specific environment in which they operate. The topology can be such that fiber-fed "cabinet" lines and exchange lines can be mixed in the same binder.

As can be seen in FIG. 2, the lines from CO 220 to users 292 share binder 222, which is not used by the lines between CO 210 and users 291. Moreover, another binder 240 is common to all of the lines to/from CO 210 and CO 220 and their respective users 291, 292.

Figure 3A:
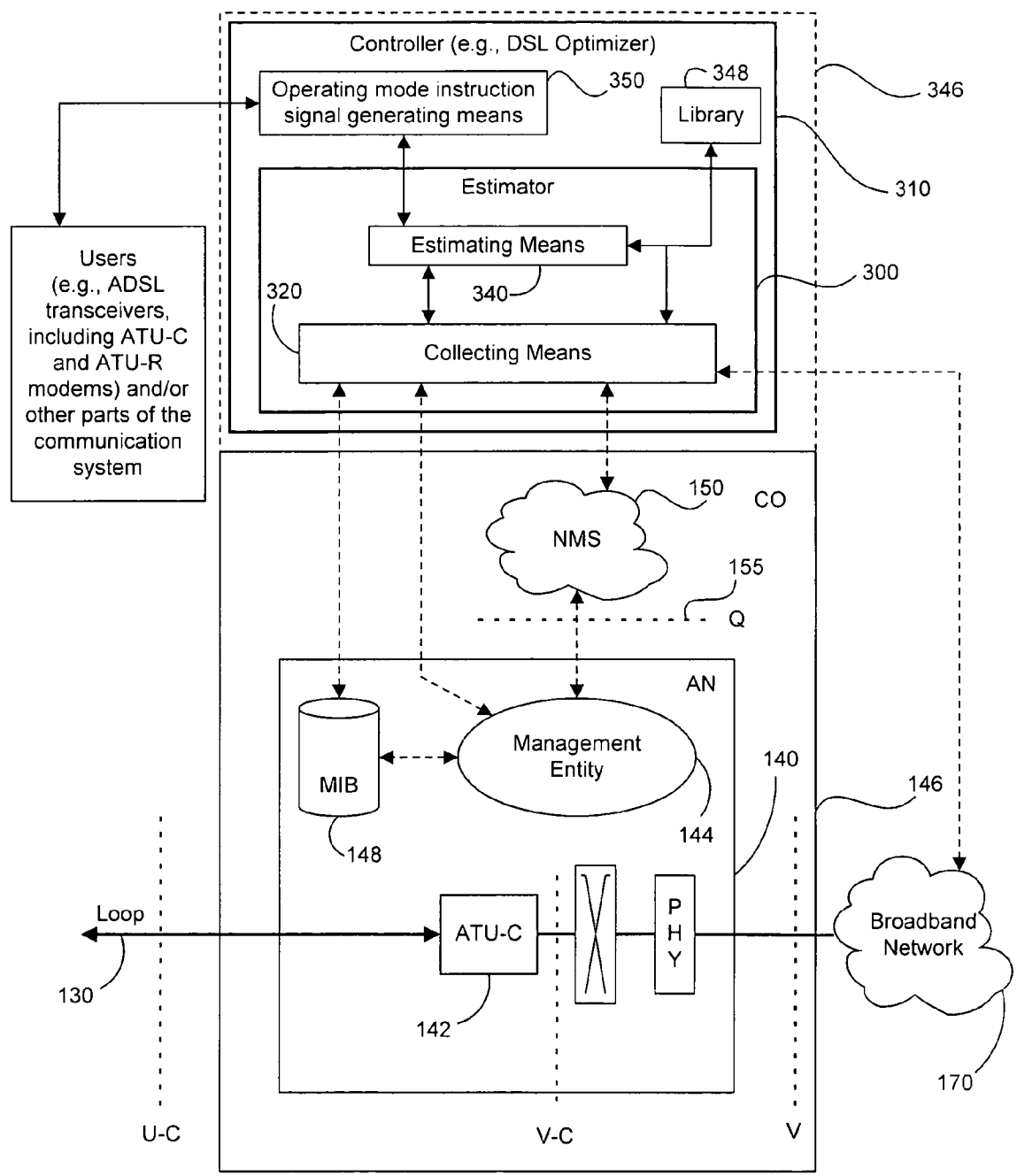
FIG. 3A is a schematic block diagram of one embodiment of the present invention in a DSL system.

According to one embodiment of the present invention shown in FIG. 3A, the estimator 300 may be part of an independent entity monitoring a DSL system as a controller 310 (for example, a DSL optimizer or dynamic spectrum manager) assisting users and/or one or more system operators or providers in optimizing their use of the system. Such a controller can benefit greatly from knowing an exact or approximate system configuration. (A DSL optimizer or dynamic spectrum manager may also be referred to as a Dynamic Spectrum Management Center, DSM Center, System Maintenance Center or SMC.) Estimator 300 may be used for determining basic loop configuration information and for other purposes (for example, detecting and measuring bad splice locations). In some embodiments, the controller 310 may be an ILEC or CLEC operating a number of DSL lines from a CO or other location. As seen from the dashed line 346 in FIG. 3A, controller 310 may be in the CO 146 or may be external and independent of CO 146 and any company operating within the system. Moreover, controller 310 may be connected to and/or controlling multiple COs. In the exemplary system of FIG. 3A, the estimating means 340 is coupled to an operating mode instruction signal generating means 350 in the controller 310. This signal generator 350 is configured to generate and send operating mode instruction signals to users in the communication system (for example, ADSL transceivers). These instructions may include acceptable data rates, transmit power levels, coding and latency requirements, etc.

The system configuration sought to be approximated can include the number of users, the number of lines (active and/or inactive), operational characteristics of the system, etc. As will be appreciated by those skilled in the art, if the controller/dynamic spectrum manager is a wholly independent entity (that is, not owned and/or operated by the company owning and/or operating lines within the CO), much of the system configuration information is unavailable. Even in cases where a CLEC or ILEC functions as and/or operates the controller 310, much of the system configuration data may be unknown.

The estimator 300 includes collecting means 320 and estimating means 340. As seen in FIG. 3A, the collecting means 320 may be coupled to NMS 150, ME 144 at AN 140 and/or the MIB 148 maintained by ME 144. Data also may be collected through the broadband network 170 (for example, via the TCP/IP protocol or other means outside the normal internal data communication within a given DSL system). One or more of these connections allows the estimator to collect operational and/or performance data from the system. This allows means 320 to collect standard DSL data available (for example, pursuant to applicable standards) from network elements and/or special data from users, system components, operators, etc. This collected data may be operational data such as performance-characterizing data and the like, resulting from use of one or more DSL loops or other communication lines in a given communication system. Data may be collected once or over time. In some cases, the collecting means 320 will collect on a periodic basis, though it also can collect data on-demand or any other non-periodic basis, thus allowing the estimator 300 to update its system configuration approximation, if desired.

In some embodiments of the present invention, the estimator 300 may be implemented in a computer such as a PC, workstation or the like. The collecting means 320 and estimating means 340 may be software modules, hardware modules or a combination of both, as will be appreciated by those skilled in the art. For management of large numbers of lines, databases may be introduced and used to manage the volume of data generated by the lines. The estimated system configuration may be determined using a maximum likelihood (ML) methodology. In such approaches, which are well known to those skilled in the art, certain comparisons and other data may be weighted more heavily, depending upon the likelihood of one configuration relative to another. Such likelihood can depend on known characteristics or likely characteristics of the loop inferred from phone-company records, previous data collected on previous uses of the line, or general practices inferred from a mass of data collecting over a large body of such systems over time. Other methodologies that can be used with or in place of maximum likelihood approaches are also well known to those skilled in the art.

Figure 3B:
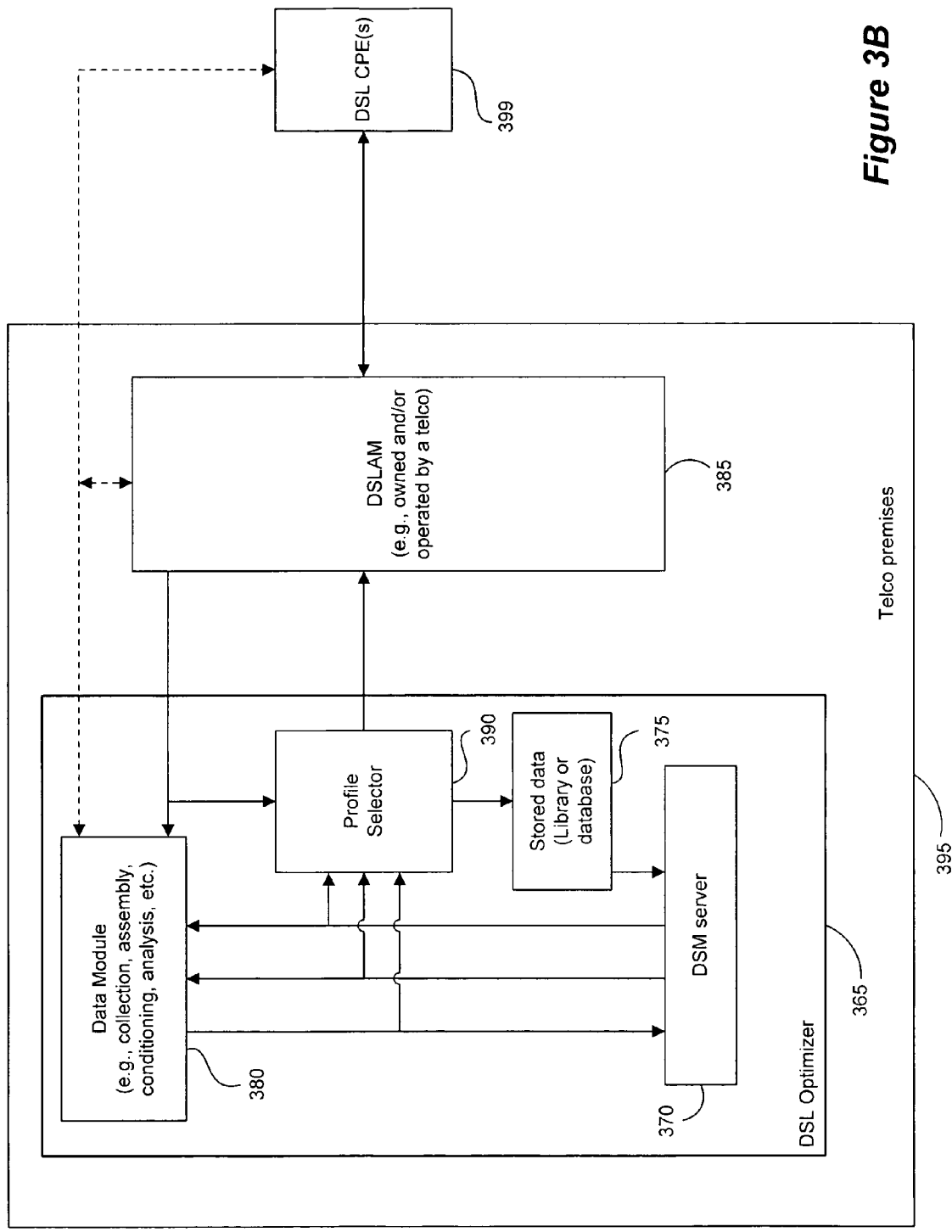
FIG. 3B is a schematic block diagram of another embodiment of the present invention in a DSL system.

Another embodiment of the present invention is shown in FIG. 3B. A DSL optimizer 365 operates on and/or in connection with a DSLAM 385 or other DSL system component, either or both of which may be on the premises 395 of a telecommunication company (a "telco"). The DSL optimizer 365 includes a data collection and analysis module 380, which can collect, assemble, condition, manipulate and supply operational data for and to the DSL optimizer 365. Module 380 can be a computer such as a PC or the like. Data from module 380 is supplied to a DSM server 370 for analysis (for example, loop configuration estimation, bad splice detection, bad splice location, etc.). Information also may be available from a library or database 375 that may be related or unrelated to the telco. A profile selector 390 may be used to select and implement profiles used during scanning to create, maintain and update any libraries and/or databases used in estimating loop configurations, etc. Profiles may be selected under the control of the DSM server 370 or by any other suitable manner, as will be appreciated by those skilled in the art. Profiles selected by selector 390 are implemented in the DSLAM 385 and/or any other appropriate DSL system component equipment. Such equipment is coupled to DSL equipment such as customer premises equipment 399. The system of FIG. 3B can operate in ways analogous to the system of FIG. 3A, as will be appreciated by those skilled in the art, though differences are achievable while still implementing embodiments of the present invention.

Maximum likelihood, defining a measure of closeness, attempts to find among the set of postulated models the model that has the smallest difference from the collected data—or equivalently is thus the most likely system configuration. Several measures of closeness, along with several parameterized sets of channel models, may be defined and used as the process proceeds and more is learned about what works best. This may depend on service provider practices, binder manufacturers, noises in different areas, etc.

For example, it may be possible to base a prediction or estimate on at least the reported maximum rate, bit table, current rate, margin at that rate and attenuation from the minimally reporting current ADSL1 systems in the field. Such information can be processed by the estimator and compared with a number of postulated line lengths, with or without bridged taps and various noise possibilities, that would generally conform to the downstream and upstream attenuation reported and any other information available. These estimates can then be compared to the reported values to see how closely they reproduce the current rate, margin, and maximum rate for the reported data. Of particular importance, proximity to the current bit distribution shape may be very helpful in assessing a best or reasonable parameterized model for the estimator (for instance bit distributions with holes may indicate the presence of bridged taps and/or narrowband radio noise).

Figure 4:
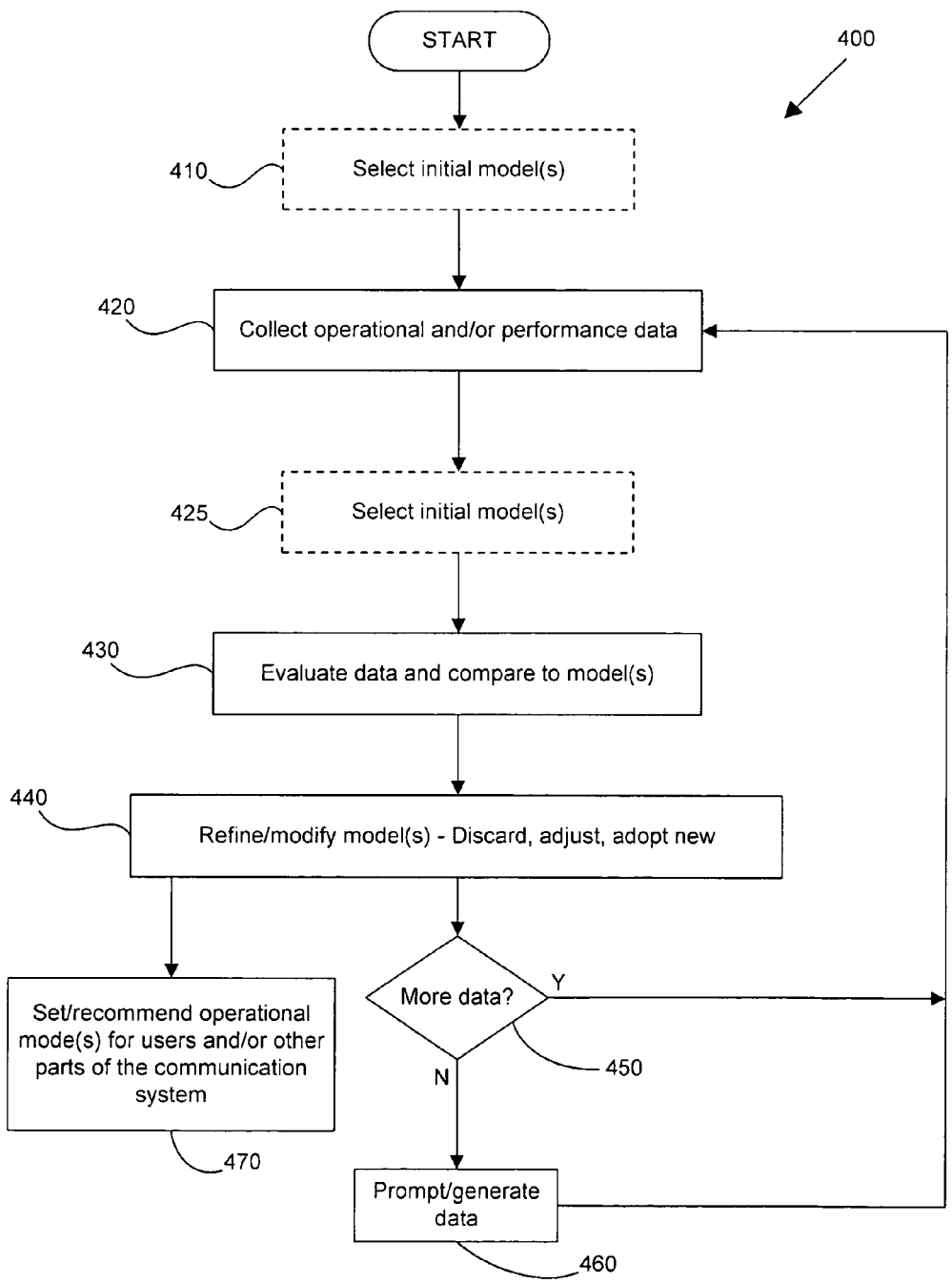
FIG. 4 is a flow diagram of methods according to one or more embodiments of the present invention.

An embodiment of one method according to the present invention is shown in FIG. 4. The method 400 can be performed by a controller, estimator, dynamic spectrum manager, computer, etc. After starting, one or more initial models may be selected at step 410. For example, a standard 50 pair binder with average crosstalk and transmission properties might be chosen. Other models could include a single pair with various noise models or various numbers or combinations of pairs, pair lengths, bridged-tap positions and/or noise combinations. Alternately, a series of common, different model types might be selected as guides. These models may be parameterizable. Parameterized models might be based on or include the channel insertion-loss transfer function for a known or parameterized length (and any known or parameterized bridged-tap lengths and positions), any inferred or operational data regarding individual users' power levels and/or their corresponding PSD levels, the bit error or time-averaged versions of errors (such as errored seconds and/or code violations with time), their corresponding code settings and/or the parameterized shaped PSDs of potential noises. Models may also be selected at a later time in the process.

Data is then collected at step 420 from available sources (for example, data can be collected from an AN ME "internally" with TL1 commands, SNMP or other protocols through the service provider's network management system or operations center; it also would be acceptable if transmission is possible from the AN ME to send data "over the internet" or "externally"; or data can be collected from a remote ME via the embedded operations channel bits, or alternately over the internet). Again the types of data and the frequency of data collection can be determined by those skilled in the art (for example, different data sets may be collected at different times). The collected data is then evaluated and compared to the model(s) currently under consideration at step 430. If an initial model or group of potential models was not selected before data was collected, then one or more models may be selected at step 425 (of course, new models may be selected at any time in the process). The selection of models at step 425 might be preferred in some cases where an estimator wants some initial data on which to base the selection of potential models. At step 440, the model(s) may then be refined, modified, discarded and/or new models selected, depending on the results of the evaluation. A history of collected data over time may be mined to refine the choice and alteration or adjustment of one or more models.

Where the estimator achieves a suitable estimate of the system configuration, for example after refining one or more models at step 440, the estimator or controller then can send recommendations, instructions or other communications to transceivers, users and/or other parts of the communication system at step 470. These instructions may be requirements for operational modes or may be recommendations for improving performance and/or services for that user. Such instructions may concern setting data rates, transmit power levels, spectral shaping and composition, etc. Such instructions may also request or command that additional excitations of the line (perhaps under different data conditions such as different data rates, different start/minimum and/or end/maximum frequencies in DMT and/or different PSD or power levels) that might allow better match to existing or conjectured models in the estimator.

This process can be an iterative one, where at step 450 more data is sought. If more data is available from user, test or other "normal" line activity, then it is collected again at step 420, evaluated at step 430 and used to refine the model(s) at step 440. If no additional data is available at step 450, an estimator may "prompt" or stimulate the system to generate data at step 460. For example, the estimator can send test signals on inactive user lines or on lines that are not currently carrying DSL services to provide a control signal or data set, then measure the effects on other lines, as reflected in the those other lines' performance. The process may also view the times of excitation of signals (test, prompted or normal user data) on various lines to determine which lines interfere with one another and to what extent or degree. Data collected may be considered in connection with loop records where users are in common binders or cables. This type of analysis can lead to a more accurate assessment of mutual crosstalking levels, particularly since those levels may vary over a wide range (for example, 4 orders of magnitude or more) between the same two pairs in different cables because of imperfections in cable construction and twisting. Such information can lead to dramatic improvement in the subsequent assessment of data rates and services to be offered on DSL lines to customers.

Operational data that may be collected in current DSL systems (for example, ADSL1 systems) can include, for example: (1) channel average attenuation measurements, (2) channel bit distributions, (3) channel transmit power levels, (4) reported current data rates, (5) reported maximum attainable data rates, (6) reported error-correction-parity and/or other overheads (which, though not reported, might be inferred from other data), (7) use of trellis codes (which also typically must be inferred), (8) ATM or other protocol cell counts (which denote user activity levels), (9) time stamps for evaluating mutual effects and absolute time-dependent line conditions, (10) vendor identification and serial numbers, (11) time stamp for a major change in transmission parameters as in retraining, (12) the number of major changes in parameters or attempts to change parameters, and/or (13) code violations, FEC violations, and/or errored second counts.

Additionally, data may be collected in future DSL systems that may further include, for example: (14) frequency-dependent measured channel insertion loss, gain, phase, and/or logarithmic magnitude; (15) frequency-dependent measured quiet-line or active-line noise levels, (16) transmitted PSD levels, (17) signal-to-noise ratios, (18) bits and gains quantities from bit-swapping, (19) various other quantities such as echo responses (depending on the equipment manufacturer) or impedance measurements, (20) worst-case noise changes and associated times, (21) detailed FEC error location indications, (22) carrier masks (CARMASK of G.997.1 or similar), (23) tone-spectral shaping parameters (for example, the TSSpsds, TSSpsus and/or PSDMASK MIB element in G.997.1), (24) vectored or matrix channel characterizing data, (25) the frequency/tone index of highest noise change in a recent interval of time, (26) the total number of bit-swaps occurring in a recent time interval, (27) the distribution of FEC errors, code violations and/or errored seconds violations over several successive sub-intervals of an interval programmed by a dynamic spectrum manager or determined in another way, (28) the peak-to-average ratio of noise or MSE measurements and/or variations over a recent time interval, and/or (29) higher-level protocol-throughput measures. As more types of operational data and means for acquiring such data become available, embodiments of the present invention can be upgraded to provide more accurate system estimates and better recommendations regarding system parameters and operations.

Item (25) above, the frequency/tone index of highest noise change in a recent interval of time, is the tone index that indicates on which tone the noise changed most during a recent measured interval (for example, a default period of 30 seconds or a programmed period). Such a feature allows a controller (such as a dynamic spectrum manager) to know of frequencies particularly affected by time-varying noises such as crosstalk that turns on and off. A controller might ML detect that one or more crosstalkers are significant in some band via this information (for instance seeing how this data changes, perhaps only showing two levels (high and low), indicating only one strong crosstalker turning on/off—or more levels, indicating that more than one crosstalker is significant). Knowledge at the DSM center of the excitation patterns and telephone/binder numbers of other crosstalkers could allow the maximum likelihood inference of which lines significantly crosstalk into one another.

Item (26), the total number of bit-swaps occurring in a recent time interval, allows a controller to determine if noise is relatively stationary on a given DSL line, or varying with time on that line. More stationary lines (showing more uniformity and/or consistency over time) might have their MAXSNRM reduced, etc. The number of swaps can also be a good indicator of which crosstalker(s) turned on, etc.

Finally, item (27), the distribution of forward error corrections, code violations and/or errored seconds violations over several successive sub-intervals of an interval (for example, programmed by a dynamic spectrum manager or determined in another way), helps a controller or estimator determine the degree of intermittency of noise. As will be appreciated by those skilled in the art, there typically are 4 levels of errors reported in ADSL systems: errored seconds (reported every second); severely errored seconds; code violations (reported every 17 ms in ADSL1); and FEC errors (reported every S symbols—so that if S=1, then the errors are reported every 250 microseconds). If FECs are counted in short intervals (for example, 1 second or smaller), then an estimator or controller can get an idea of how distributed an intermittent noise is. If at some short enough interval (for example, length of S packet, where the S packet is a "short" packet of data information delivered to the dynamic spectrum manager that contains the FEC errors among other information such as margin levels, power, and related quantities) successive reported FEC errors are found to be "bursty," then interleaving will help further. If the reported FEC errors are about the same for all short intervals, then interleaving will not help, and the parity should be increased. Thus, an estimator or controller can ML detect whether the impulse noise is "bursty" or more uniform and, indeed, how far apart the bursts are (if the noise is entirely uniform, then the noise is almost stationary and bit-swapping should get it).

During this process, each potential model's likelihood of accuracy can be evaluated. One or more models that best fit the collected operational data and any other empirical evidence can be chosen to serve as a model (or models) for considering improvements and/or other changes to the system. Again, the likelihood of a model's accuracy can be based on various indicators of system performance, such as:

Observed operational data (generated by users' "normal" use of the system) that shows operating performance based on normal operation signals; and/or Test data (generated by testing normally conducted on the system) that shows operating performance; and/or Prompted operational data (generated by stimulating the xDSL system) that shows operating performance based on stimulation signals.

The model(s) can be continuously/periodically updated and revised, depending on the data collected and evaluated (or may be updated on a non-periodic and/or prompted basis).

The prompted operational data can be time-relative events (using the time-stamp field referred to in the Appendices) to allow the dynamic spectrum manager to view "cause-effect" relationships between the lines. This allows the manager to determine lines that may be crosstalking into one another. Such knowledge allows a number of approaches to further improvements in DSL performance, as will be appreciated by those skilled in the art. For an ML estimation method, time-indexing events on different lines in the DSM center may be used, ascertaining likely mutual interferers and thus more accurately modeling the situation. This time-variation and correlation concept can be extremely useful. For example, even when lines are not changing at all, knowing which ones are really affecting one another can be very useful.

Figure 5:
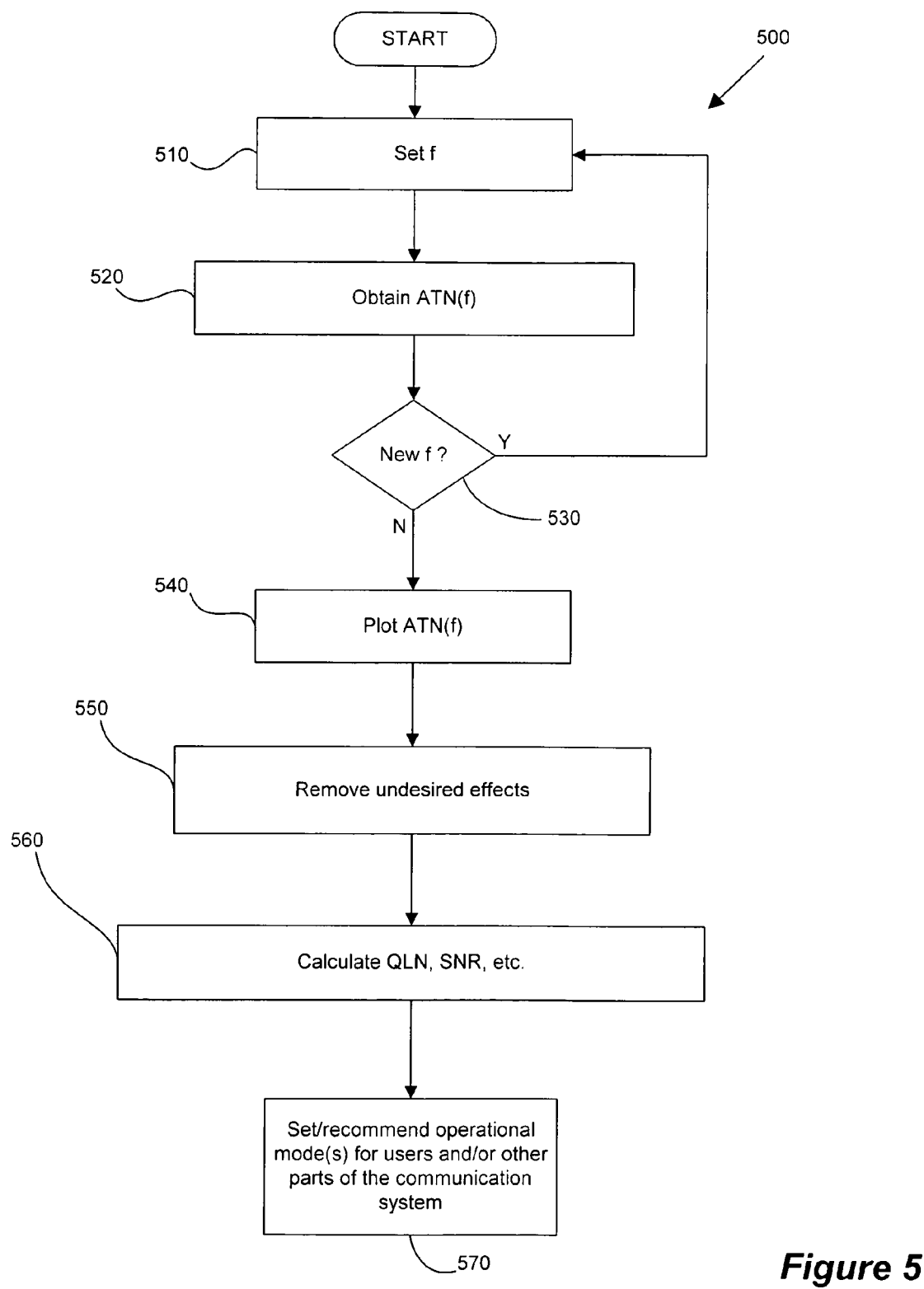
FIG. 5 is a flow diagram of methods for acquiring and calculating the Hlog of a channel, according to one or more embodiments of the present invention.
Figure 6:
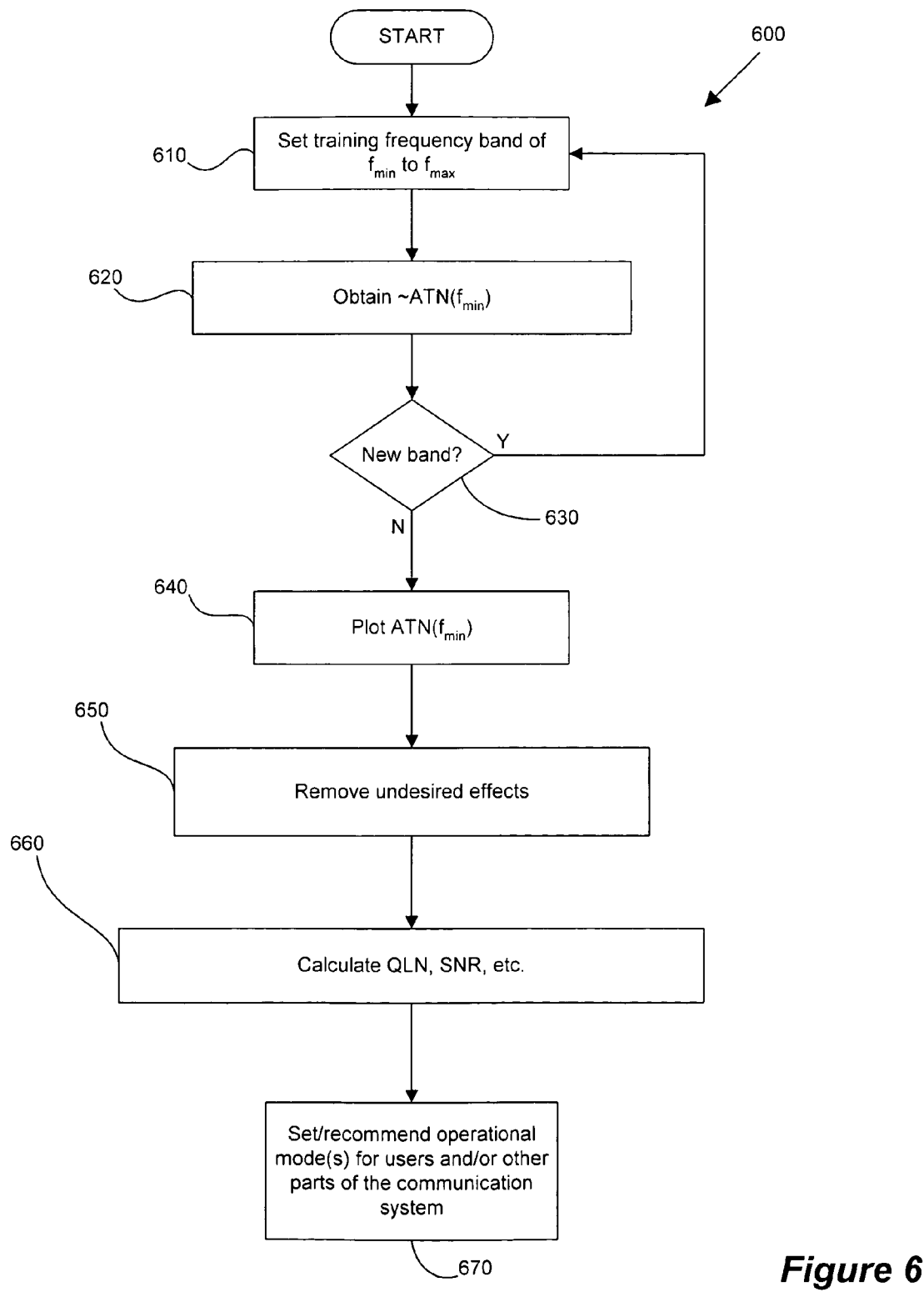
FIG. 6 is a flow diagram of alternate methods for acquiring and calculating the Hlog of a channel, according to one or more embodiments of the present invention
Figure 7:
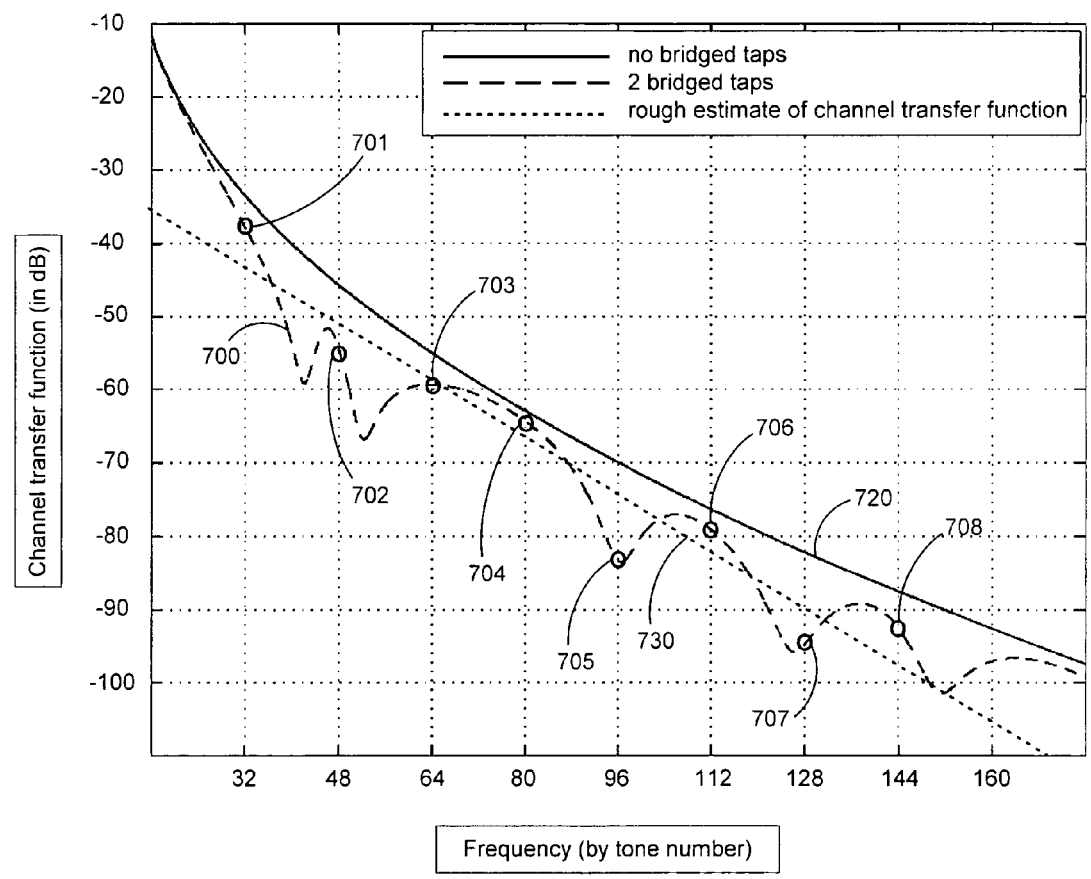
FIG. 7 is a graphical depiction of estimated Hlog data obtained and calculated according to one or more embodiments of the present invention.

Another example of prompting the generation of operational data can be seen in connection with FIGS. 5-7. Signals transmitted through copper pairs are attenuated due to the power dissipation caused by the resistance of the wires. The attenuation, or insertion loss, depends on loop length, making it more challenging to provide high rates over long loops. For example, usually operators do not honor requests for ADSL service if the customer loop exceeds 18 kft. Resistance is not the only impairment in transmission lines. In fact, a metal wire is characterized in general by a cascade of elementary two-port networks, as will be appreciated by those skilled in the art.

Phase velocity and the phase delay of the transmitted signal vary with respect to the frequency as a result of capacitance and inductance effects. Moreover, a signal's attenuation also depends on frequency, leading to a non-flat attenuation characteristic. The magnitude of the transfer function for a 750 meter 26 gauge (0.4 mm) twisted pair (which is 6 dB lower than the insertion loss if the line is properly terminated) is shown as line 720 in FIG. 7.

Line 700 shows the "notching" effect of bridged taps on the channel characteristic. Bridged taps are twisted pairs that are connected to some point of the loops and left unterminated at the other end. Due to the signal's attenuation and the resulting notched channel characteristic, bridged taps cause rate loss and severe inter-symbol interference in DSL frequencies. Unfortunately, for the largest part of the telephone network, existing databases are not always accurate, and it is impossible to know the exact location of the bridged taps. In North America, roughly two thirds of the loops have bridged taps, and of these, half have two or more taps. While operators have been developing bridged tap location methods, it is expected that many DSL loops will retain their bridged taps. For systems in operation, the channel is continuously measured and its transfer function is estimated in order to calculate modulation parameters and guarantee reliable operation.

Hlog, quiet line noise (QLN), and run-time noise (MSE) are information regarding channel gain and average noise power over all tones used in transmitting data. Downstream Hlog and QLN are estimated accurately during training of an ATU-R modem, and those estimations are available at the ATU-R. MSE is estimated during run-time (sometimes called "showtime" in ADSL). However, the values are not reported to the ATU-C and there is thus no way of knowing downstream Hlog, QLN and/or MSE at the ATU-C. Because ADSL1 does not pass these parameters to the ATU-C, accurate information on downstream Hlog, QLN and/or MSE has been considered unavailable at the ATU-C and has thus never been used in operational decision making and/or parameter setting. ADSL2 does pass these parameters to the ATU-C but ADSL2 is not in wide use and requires that both the ATU-C and ATU-R are ADSL2-compliant, a situation that currently is unlikely. Even then, an ADSL customer may replace their ADSL2 modem with an ADSL1 modem (for example, a modem used at some time previously in an office or residence). Over 100 million ADSL1 modems are currently in existence.

QLN is the measured noise when the modem is neither active nor training. However, the noise may change significantly with time. This noise at later times during operation is referred to herein as MSE noise (Mean-Square-Error noise) or MSE function. The MSE noise can be estimated at any time by the follow formula (using dB)

$$MSE[n]=PSD[n]+Hlog[n]-SNR[n]$$

(where Gap in dB is (9.5+TSNRM—CODEGAIN) and SNR $[n] \approx 10^{GaP/10} \times 2^{(2B[n])} - 1$ is reported in ADSL2 modems and is computable from past or current reported bit distributions B[n] in ADSL1 modems). The SNR may be computed or inferred using initial PSD, Hlog and/or QLN. The PSD[n]= REFPSD+G[n] (where G[n] is the known or estimated gains table value in dB), and REFPSD=NOMPSD−PCB. Since G[n] usually satisfies −2.5 dB<G[n]<2.5 dB in ADSL1 modems, but might not be reported, G[n] can be estimated by looking for B[n] table changes, usually being near −2.5 dB on the tone with higher number of bits between two adjacent tones and usually near +2.5 dB on the tone with lower number of bits between two adjacent tones.

Even though downstream Hlog and QLN (and/or MSE) are not reported to the ATU-C, other data such as the downstream bit distribution, downstream margin, downstream transmit power and downstream attenuation are typically reported back to the ATU-C. In particular, downstream attenuation usually is calculated as the average attenuation of the information bearing tones (if attenuation is calculated in this manner, it is defined as signal attenuation in xDSL standards), and this provides a reasonable approximation (which can be refined using the bit distribution) of the attenuation of the lowest frequency tone among the information bearing tones. In other words, in a downstream transmission, the value of Hlog is dominated by the lowest data-bearing frequency ($f_{min}$) in the used band (and, to some degree, several of the frequencies above $f_{min}$), meaning that the attenuation measured for a relatively small band of data bearing frequencies bounded at its lower end by $f_{min}$ will be a good approximation for Hlog($f_{min}$). Therefore, the Hlog of several tones among the tones used can be closely estimated using the downstream attenuation. The available profile and TL1 functionalities in some ADSL systems can be used in these techniques.

Some ATU-R modems might calculate downstream attenuation as the average attenuation of all downstream tones that can be used for allocating information bits (if attenuation is calculated in this manner, it is defined as line attenuation in xDSL standards). For the modems, the attenuation provides a reasonable approximation of the attenuation of the lowest frequency tone in downstream band.

As will be appreciated by those skilled in the art, $f_{min}$ typically is the lowest frequency in a selected carrier mask when signal attenuation is being calculated by the modem. However, this may not always be true. A selected band of frequencies (in a carrier mask, for example) may include one or more lower frequencies that are not used (that is, to which bits are not assigned during bit loading) for various reasons (such as when the channel for this frequency is so poor that it is not assigned any bits). In such situations, the bottom most frequency may not therefore be $f_{min}$. A controller evaluating a line's attenuation will know from the reported bit distribution what the value of $f_{min}$ is (where $f_{min}$ is the lowest data bearing frequency and/or tone). In the present discussion and accompanying drawings, $f_{min}$ may be assumed to be the lowest tone and/or frequency in the selected carrier mask, which is a valid assumption in most situations. However, embodiments of the present invention contemplated those situations where $f_{min}$ may not be that lowest frequency in the carrier mask. Embodiments of the present invention also may intentionally increase $f_{min}$ specifically for the purpose of measuring the attenuation at a set of different frequencies in successive training intervals.

When a group of Hlog approximation values are obtained for several frequencies, the points plotted on a transfer function graph can be used to generate a line approximating Hlog. Two methods for obtaining this approximation are shown in FIG. 5 and FIG. 6. As seen in FIG. 7, one or more of the data points 701-708 can be obtained using one of the methods of FIGS. 5 and 6. In the example of FIG. 7, points 701, 702, 703, 704, 705, 706, 707 and 708 correspond to tones 32, 48, 64, 80, 96, 112, 128 and 144, though other tones and/or frequencies could be used, as will be appreciated by those skilled in the art. If only two points are obtained, these would define a line through the two points. In the case of 3 or more points, as shown in FIG. 7, these points can be used to approximate a line 730 and to determine any variance therefrom. As noted below, line 730 is a rough estimate of the channel transfer function and may or may not be of value in a given situation. As more data points are collected, a more accurate depiction of the true transfer function 700 (including the effects of bridged taps, if any) can be developed. In FIG. 7, the true channel transfer function including bridged tap effects is shown as line 700.

As can be seen from that plot, transfer function 700 (Hlog) has several "dips" and may have some displacement from 720 (which represents the channel transfer function if no bridged taps were present). The sinusoidal dips in a transfer function typically are due to bridged taps in the line. The number and length of such taps (2 taps in the case of FIG. 7) distort the "no bridged taps" transfer function 720, resulting in the channel becoming function 700, which is the true representation of the capacity of the DSL line being tested. However, lines 720 and 730 can be useful in some situations. For example, line 720 represents the channel capacity if any bridged taps present were removed. This might provide an operator with a suitable evaluation tool for deciding whether a truck roll is warranted to repair/upgrade the user's DSL line. As will be appreciated by those skilled in the art, the difference between lines 700 and 720 in FIG. 7 represents the data capacity lost because of the presence of the bridged taps. Additionally, some remote locations may have attenuators connected to their lines (remnants of prior telco problem-locating efforts). This additional attenuation can likewise be estimated from the measured data and the line capacity increase from a truck roll can be calculated, for example in cases where higher speeds are desired. Line 730 represents a rough approximation of the transfer function. While not very accurate, line 730 may nevertheless be useful in situations where only a small number of data points are available to the controller in determining Hlog. The rough estimate data can still be used in improving system performance and/or estimating the configuration of the system by a dynamic spectrum manager and/or the like. Moreover, the rough estimate can be further improved by utilizing information such as the bit distribution.

Using appropriate bridged-tap models, line 700 can be estimated from whatever points are available (for example, two or more of points 701-708 in FIG. 7). If needed, undesirable effects can be removed using suitable approximations the effects on Hlog 700 (or Hlin). However, effects typically should not be removed that would affect the accuracy of the estimation of the line insertion loss. It is helpful for dynamic spectrum managers and/or service-provider operations personnel to be able to consider the effects of bridged taps. Filters on the channel likewise can affect the measured attenuation values and might need to be removed from the measured data points. Removal of modem-filter effects might be necessary for many situations where filtering inside of the modem improves performance but clouds the appearance of the measured transfer function from being the true insertion loss. All these corrections to the measured attenuation values are known to those skilled in the art, as are techniques for removing and/or accounting for their influence on the Hlog values. Three or more points corresponding to three Hlog[n] values at different tones can be used to infer slope and bridged-tap length theoretically, with more than 3 points making a fit to possible known insertion-loss curves more informative and allowing determination of multiple bridged-tap lengths.

When the final approximation of Hlog is determined, the line can be used in several ways. For example, the slope of line 720 is proportional to the length of the twisted-pair line. Moreover, the noise value can be obtained when the Hlog values are considered along with known bit distributions and known transmit power-spectral-density levels. Therefore, using ADSL1 technology, ADSL2 data and operational characteristics can be determined and used to optimize and/or otherwise improve ADSL1 system operation in systems where the element management system does not provide some or all of this useful information.

Some embodiments of the present invention use various operational data that can be collected by choosing different line profiles composed of different control information, where the line profiles can be chosen and controlled by a controller (such as a DSL optimizer and/or DSM server) and implemented via a DSLAM or other suitable means. A line profile specifies one or more restrictions (control information) imposed on the associated DSL line, such as (without limitation) specifications and/or restrictions regarding minimum data rates, planned data rates, maximum data rates, transmit power, maximum power spectrum density, carrier mask, maximum-additional SNR margin settings (noise margins), target SNR margin settings (noise margins), minimum SNR margin settings (noise margins) and/or FEC (forward error correction) parameters, including the INP and DELAY settings of ADSL2. Other profile criteria will be apparent to those skilled in the art. The operational data for each line profile can be collected after the training of the ATU-R modem with the line profile. The process of using multiple line profiles with multiple trainings and data collections for the purpose of collecting diverse operational data is referred to as "scanning" in connection with embodiments of the present invention. Scanning can be used for various purposes including Hlog estimation.

For estimating Hlog, some embodiments of the present invention use multiple trainings of the ATU-R using line profiles with different carrier masks. Each individual training provides a data point of the transfer function showing Hlog. Different techniques can be used to generate these transfer function data points, including (but not limited to):

FIG. 5—A carrier mask having only one data bearing tone f is selected 510 (given, for example, in either Hz or as a DSL tone number), the attenuation ATN(f) is obtained 520 and this can be repeated 530 as appropriate. ATN(f) is plotted 540 and any effects that are undesirable can be removed 550. Hlog, QLN, etc. can then be calculated 560 and recommendations made as to operational modes of users and/or other parts of the communication system 570. The reported downstream attenuation for each f selected is close to or the same as the Hlog value of that one active tone (providing Hlog values for any tones used and generating an approximation of the transfer function plot). And/or FIG. 6—A carrier mask is selected at 610 which includes a group of tones (using, for example, the CARMASK function of ADSL1 or ADSL2) between $f_{min}$ and $f_{max}$ ($f_{min}$ may either be the lowest frequency in the selected band or the lowest data bearing frequency, if the lowest frequency in the band is non-data bearing). ATN($f_{min}$) is obtained at 620 and additional bands may be tested 630, as appropriate. The values of are plotted 640 and any undesirable effects removed 650. Hlog, QLN, etc. can then be calculated 660 and recommendations made as to operational modes of users and/or other parts of the communication system 670. In this method, the downstream attenuation is used to estimate Hlog of the tones near $f_{min}$. In most situations, the lowest frequency in the modem-selected set of tones is $f_{min}$ and thus it the estimation of ATN($f_{min}$) in step 620 is generally quite accurate. By using a variety of values for $f_{min}$ and repeating the training, the Hlog of the whole bandwidth can be well estimated.

In either of the two exemplary methods described, lower tones in the relevant available spectrum can be used. For example, for carrier masks of groups of frequencies in ADSL1 in the method of FIG. 6, tones 32 (centered at 138 kHz), 48, 64 (frequently a pilot tone in some systems), 128, 200 may be used to designate $f_{min}$. These frequencies likewise can be used as the individual tones used in the method of FIG. 5.

The above two examples can be viewed as scanning Hlog using various carrier masks that sweep $f_{min}$ over anywhere from a few to many separated choices. If a given communication system requires use of a pilot tone, that pilot tone may have to be included in any carrier mask used to approximate Hlog. In these cases, use of $f_{min} < f_{pilot}$ might be necessary if the approximation that measured attenuation equal to Hlog [$f_{min}$] is to be used. As will be appreciated by those skilled in the art, there are many ways of scanning Hlog, but methods and techniques selecting multiple carrier masks and repeating training for each choice are simple and effective. In fact, the same applies to upstream, and the upstream attenuation values that correspond to a set of upstream carrier masks can be collected and used for estimating Hlog of the upstream band. Ultimately, the Hlog[f] estimates from both upstream and downstream can be processed together to obtain the best estimates of transfer functions 700 and 720 in FIG. 7.

If it is desirable to minimize the number of trainings used to obtain a reasonable approximation of Hlog (for example, where profiles are used for training and the number of profiles is limited), then a subset of tones can be reliably estimated using the downstream attenuation and select carrier masks, interpolating and/or extrapolating the values of Hlog for other tones within and/or outside the tested tones.

Once the Hlog estimate is available at the ATU-C, QLN and/or MSE can be reliably estimated using the bit distribution, the Hlog estimate and other parameters available at the ATU-C, such as the power-spectral density level or equivalents. The reliable estimates of Hlog and QLN or MSE at the ATU-C allow a controller (for example, a dynamic spectrum manager) to collect operational data from only the ATU-C with almost no information loss when compared to situations and techniques where the operational data is collected from both an ATU-C and ATU-R. Therefore, accurate calculations of desirable operation parameters for each line can be reliably done without any direct report of operational data from the ATU-R to a dynamic spectrum manager or other data collection unit.

Other embodiments of the present invention permit channel identification using estimates of various parameters available from twisted-pair binder channels in DSL systems. Following are examples of such channel identification for lines with zero to two bridged taps using two types of data—reported ADSL1-standard MIB information only (that is, operational data available from ADSL1 compliant systems and equipment without special data protocols, also referred to as "ASM data" and/or "ASM information" herein) and special data and/or information sets, examples of which are described in more detail below. Examples of ASM information include, but are not limited to, the SBC "ADEPT" and "BBT" data, Telecom Italia's CANTO data, Softbank Broadband's "artificial intelligence" and Korea Telecom's ATLAS system.

Estimated characteristics and/or quantities can be chosen for their informative value, their usefulness as a basis for recommendations concerning remedial action, etc. Relevant estimates can include line length, number of bridged taps, bridged-tap length, bad splice properties, channel insertion loss and the noise spectrum. Other estimates will be apparent to those skilled in the art. From these quantities, many desirable advisory recommendations can be formulated.

As will be appreciated by those skilled in the art, different amounts and types of data may be available for different modem types. Consequently, the estimation technique employed depends principally on the data that is available. The two examples given herein for purposes of explanation and illustration of the present invention are (i) a situation where only ASM data is available and (ii) a situation in which modems supply ASM data plus supplemental insertion loss information. The standard case is treated first, with extensions to the case using supplemental insertion loss information discussed thereafter.

Embodiments of the present invention used for channel identification can use ASM information that is passed to a controller such as a DSL optimizer or DSM Center, as discussed in more detail above. Of all the ASM data, the primary data used in some of the estimation methodologies of the present invention discussed herein are the reported upstream and downstream attenuation values, which are available through and from the MIB of an ADSL system. The process by which DSLAMs and individual CPE modems compute these reported attenuation values need not be entirely understood. However, knowledge of some general concepts and properties of the estimation techniques, particularly for the DSLAM side, can be useful if available.

When reported attenuation values of some DSLAMs are strongly influenced by analog bandpass filters that isolate the upstream band from voice and downstream, the effect of these filters is readily evident by examining the loaded bit distributions for flat, AWGN lab and/or sample data, as shown in FIG.

9, illustrating a representative 1.536 Mbps lab profile 900 showing upstream bitloading. A roll-off 902 all the way down to 0 bits is seen in the data. Assuming that the channel is mostly flat over the upstream band (this is a rough approximation, though typically sufficient for this purpose), an approximation of 3 dB/bit can be used to see that the filter roll-off is quite severe near the upstream band edges. This roll-off 902 can be the cause of the difference between theoretical and reported upstream attenuation.

A similar effect is observed for the downstream attenuation values reported by modems; large variations between the reported downstream attenuation values and the theoretical ABCD modeling parameters suggest that the downstream attenuation values are not accurate in a technical sense. Some modems report a value related to line attenuation (that is, the average attenuation of the full downstream band, regardless of the signal power allocation, so that values are essentially constant regardless of profile), and some report a value related to signal attenuation (that is the average attenuation of the information bearing tones, so that values are varying with profile), though again the reported values are not entirely consistent with theoretical values of either reported line or signal attenuation.

Estimation based on noise-dependent parameters inherently necessitates noise estimation. To avoid this additional estimation of noise, some embodiments of the present invention use data that is generally noise-independent. Moreover, since the particular mechanics of the computation used by each modem and DSLAM may not be well understood, the present invention can employ self-configuring methods that avoid the need for "reverse engineering" of each hardware element to approximate the algorithms used therein.

These criteria can be met by using operational data (for example, the reported upstream and downstream attenuation operational data) together with a search and match technique. A search and match method according to the present invention can utilize a database, library or other collection of data pertaining to the relationships between attenuation values generated by various modem types and/or loop configurations. For a given modem type and loop configuration, multiple line profiles with various carrier masks are used to collect a variety of operational data. For each modem type, the reported attenuation values for a large variety of loop configurations and line profiles may be collected and saved in a database, library, etc. This collection of reference data may be stored, for example, as a library 348 in the controller 310 of FIG. 3A and used by the estimating means 340 and/or collecting means 320.

Channel identification (that is, identifying a likely loop configuration and/or its operational characteristics) then is performed by searching through the database for a loop configuration that has reported attenuation values closest to the observed attenuation values for the modem type and the set of line profiles employed. "Closeness" in matching one or more candidate loop configurations to reported data may be defined in various ways, as will be appreciated by those skilled in the art. Illustrative examples and discussion that follow will illuminate this concept.

An example of a channel estimation database for a given modem type is shown in FIG. 14, where two line profiles are used to construct the database. The database stores the reported attenuation values (other operational data also can be used also in each column for a known modem type and a known loop configuration). In this example, a loop configuration includes loop lengths and lengths of bridged taps (though other and/or additional information can be used, as will be appreciated by those skilled in the art). For a line with an unknown loop configuration (but using a known modem type that matches the modem type of the database), the two line profiles can be applied and 4 attenuation values can be collected with only minimal interruption, if any, to a user's DSL service. For example, each specially designed line profile can be applied in the very early morning for 2-3 minutes, such that the DSL user is unlikely to experience a noticeable service interruption. A comparison then can be made between the collected attenuation values and the attenuation values in each column of the database.

A very simple estimation algorithm can look for a column whose attenuation values exactly match the collected attenuation values, then link to the loop configuration information in the same column of the database. Thus, if the measured attenuation values are 14, 16, 23 and 26 for upstream attenuation using line profile 1, upstream attenuation using line profile 2, downstream attenuation using line profile 1 and downstream attenuation using line profile 2, respectively, then the line configuration is selected in which the line has a loop length of 3,000 ft and bridge tap lengths of 2,000 ft and 0 ft. However, such an algorithm might not work if there is no perfect mach in the database, thus requiring a more generally applicable estimation algorithm. Before discussing such alternative algorithms, it should be noted that the present invention is not limited solely to attenuation data. The simple exemplary embodiments of the present invention use attenuation values as the collected and/or available operational data, though other types of data may be collected and/or available and used in different situations.

An extensive database containing all possible combinations of loop length and bridge tap lengths would be desirable, though such a library is unlikely in many cases. It is more likely that the database would be sparse in the parameter space, meaning that there are many more configurations possible in an operator's network than can be pre-measured with known loop configurations in a lab or a test field. In such cases, interpolations between different database entries can form estimates of the line parameters instead of simply looking for an exact match.

In the following example, N is the total number of loop configurations in the database 348 of controller 310. For a given loop configuration n in the database, let $b_n$ be an L-dimensional column vector. The column vector $b_n$ has as its elements each of the attenuation values reported for each line profile. Thus, if 4 line profiles are used for scanning and each line profile has reported upstream attenuation and downstream attenuation, then L=4*2=8. Denote by x the attenuation values collected by applying the set of scanning line profiles on the line having an unknown loop configuration being estimated. The constant x (it is termed a constant because it is known upon completion of the operational data collection procedure) is an L-dimensional column vector, with elements in the same order as in $b_n$.

Some of the data might be missing due to incomplete data collection. In this situation, the data collection can be repeated or the corresponding data fields can be ignored. Define $B=[b_1\ b_2\ \ldots\ b_N]$. Clearly, B is an L×N matrix representing at least part of database 348. In some cases, x might perfectly match one of the columns in B. Where no exact match is found, an interpolation between different database entries can be used to generate an estimate. According to one estimation method, define $\theta$ to be a column vector with N elements, where $\theta$ is a weighting vector used to linearly combine multiple columns of B to form an estimation. The following example illustrates the use of $\theta$ in performing an interpolation:

1. For the N columns of B, find the distance of each column from x, where the distance is defined as $\|x-b_n\|^2$ for the nth column.
2. Choose three columns of B that give three smallest distances (that is, the "best columns) from the given observation x. Denote the three columns and their respective distances as $b_{n1}, b_{n2}, b_{n3}$, and $r_{n1}, r_{n2}, r_{n3}$.
3. Calculate the elements of θ as below:

$$\theta_n = \frac{r_{n1} + r_{n2} + r_{n3} - r_n}{2 \times (r_{n1} + r_{n2} + r_{n3})} \quad \text{for } n = n_1, n_2, n_3$$

$$\theta_n = 0 \quad \text{for all other } n$$

Note that $$\theta_n \geq 0, \sum_n \theta_n = 1.$$

In the preceding example, θ uses the 3 pre-measured loop configurations that are most likely the closest to the observed data's loop configuration. Moreover, θ provides weighting for calculating a loop estimation based on the 3 pre-measured loop configurations. Assuming the corresponding loop lengths for the three chosen points are 1000, 1200 and 1400 ft, respectively, the estimated loop length then will be $\theta_{n1} \times 1000 + \theta_{n2} \times 1200 + \theta_{n3} \times 1400$. Bridge tap lengths can be calculated analogously.

Use of database B and interpolation weighting vector θ can be further developed into a general and mathematical formulation where a Quadratic Program (QP) technique or methodology can be used. Define r as the "residual" of the observed attenuation values that cannot be described as a linear interpolation of other database entries, where r is mathematically defined as $$r = \sum_n \theta_n b_n - x.$$

It is clear that r is a function of the interpolation weighting vector θ. Then, the problem of finding θ can be formulated as:

$$\min_{r,\theta} r^T r$$

$$\text{such that } r = B\theta - x,$$

$$\theta \geq 0,$$

$$\sum \theta_i = 1.$$

This mathematical formulation is known as a Quadratic Program, and various known algorithms can be used to numerically find the optimal solution r and θ for given B and x. In this mathematical QP formulation, the optimal solution θ ("optimal" in the sense of minimizing the residual error defined above) is found through a mathematical programming instead of using heuristic algorithms. Note that it may not be possible to explain x as a convex weighting of $b_n$. Mathematically, there may not exist $$\theta \in R^N: \sum_n \theta_n b_n = x, \theta_n \geq 0, \sum_n \theta_n = 1.$$

Therefore, r may be non-zero for the optimal θ that is found.

The mathematical formulation can be altered, while keeping the problem in the class of Quadratic Program, such that additional information can be reflected in the solution. Possible changes, discussed below, use W and/or P matrices of the type described below.

Instead of $r^T r$, $r^T W r$ might be minimized by appropriate choice of θ, where W is a diagonal positive-definite matrix (that is, a diagonal matrix with strictly positive, diagonal elements) representing relative importance and/or reliability among the elements of r. In other words, the reliability weighting vector W (the term "reliability weighting vector" is used to distinguish the interpolation weighting vector θ) is a design parameter that can be chosen to give more weight to different line profiles used for scanning. The variable W controls the penalty in each of the components of r. Thus W may be set to give more or less priority to different elements of the residual. For example, some reported attenuation values may always be similar, regardless of the loop configuration for given modems. Their component in W could be correspondingly reduced. Stated another way, W can be used to emphasize the operational data that assists most in distinguishing (and thus identifying) different loop configurations and to de-emphasize data that is similar (and thus less distinguishing) across other loop configurations. Given a sufficient quantity of data, an adaptive algorithm can be used to control W, allowing it to be computer-controlled. W may be different, for example, for each brand and/or model of modem. That is, the weighting vector can be decided by a controller (such as a DSL optimizer and/or DSM server) after it first decides what kind of modem is on the line at the CPE, or more generally what types of modems are at both ends.

In addition to W, another matrix P can be used to introduce additional information into the optimization routine. If operational data other than attenuation values (for example, bit distribution data, etc.) indicate that the subject loop likely has a bridge tap of length between 0 and 500 ft, then it is desirable to have $\theta_n > 0$ for all n whose corresponding bridge tap lengths are between 0 and 500 ft. Besides, it would not be reasonable to consider loop configurations with bridge tap length of 2,000 ft when finding the best θ for the estimation. Thus, techniques can be employed to make some configurations more preferable than others. Put another way, loop configurations that are "far away" from the observations can be excluded or be made less desirable candidates by declaring a "cost" for each loop configuration. Let P denote this vector of "costs" (P is an N dimensional row vector) for each loop configuration in the database, and x denotes the observed attenuation values (and/or any other operational data used for estimating loop configurations). Note that P can be a function of x, can be a function of other operational data such as bit distribution, or can be a zero vector if no additional information is available. There is a tradeoff between minimizing $\|W^{1/2} r\|$ and minimizing the $$\sum_n \theta_n P_n.$$

This leads to the following minimization problem:

$$\min_{r,\theta} \quad r^T W r + P\theta$$
$$\text{such that} \quad r = B\theta - x,$$
$$\theta \geq 0,$$
$$\sum \theta_i = 1.$$

where the variables above are r and θ, and one controls the tradeoff between minimizing $\|W^{1/2}r\|$ and minimizing the $$\sum_n \theta_n P_n$$

by scaling the weights P. The mathematical formulation above is also in the class of QP, and various known algorithms can be used to numerically find the optimal solution r and θ for given W, B, P and x. Again, note that W is the pre-designed weighting vector used to emphasize relative importance among elements of r, B is the database that is constructed from the attenuation measurements of known loop configurations using pre-determined line profiles, P is the vector of costs that is independently pre-calculated from part of operational data, and x is the observed attenuation values of pre-determined line profiles.

Figure 10:
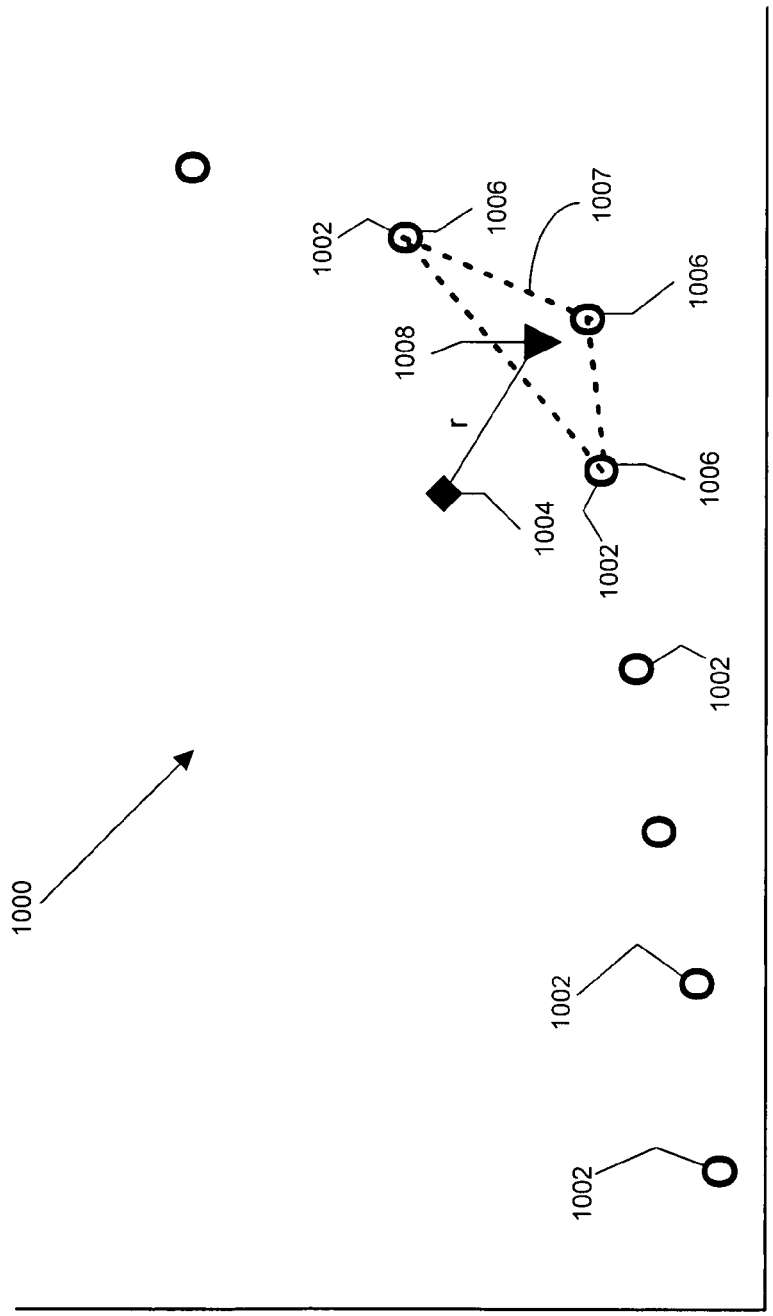
FIG. 10 is a graphical depiction of one embodiment of the present invention in which an unknown DSL loop configuration is estimated.

FIG. 10 illustrates one example when L=2. In practice, L typically is much larger than 2, however it is difficult to illustrate in a 2-dimensional figure a situation in which L>2. Moreover, extrapolation of the L=2 case to other situations with more loops will be apparent to those skilled in the art. In the example of FIG. 10, the x-axis can represent upstream attenuation for a known line-profile while the y-axis represents downstream attenuation for the same line-profile. Each loop configuration in the database is represented by each data point 1002 in the plot 1000. These data may also be developed and stored in connection with a known modem type. The DSL line to be identified and/or estimated is illustrated by point 1004, which represents the observed operational data (such as attenuation values). In this example, entries in the database that are "nearby" the observation are sought (that is, entries that do not vary substantially from the observed operational data). Ideally, the observed attenuation values would exactly equal or match one element of the loop configuration database, or be between or within a convex combination of other entries. The convex hull 1007 of 3 of the profiles 1006 (those for which $\theta_n > 0$) is illustrated by the dashed lines. That is, those loop configurations for which $\theta_n > 0$ are the extreme points of the polygon formed by the dashed lines. The estimate, shown as point 1008 within hull 1007, is $$\sum_n \theta_n b_n = B\theta.$$

As noted above, QP (optimization) problems are a member of the class of convex optimization problems, and numerous efficient numerical techniques have been developed to solve them, as is well known to those skilled in the art. The implementation pursued in the above embodiment is a Newton-based interior point technique that exploits the problem's inherent linear algebraic structure (meaning that the method of solution of the QP is not unique.

The performance of the QP formulation may be limited in a controller's application by the granularity of the reported attenuation values, that in the case of attenuation values may be at least 1 dB. As such, this technique can experience some difficulties when used in practice. Further, in many cases it may not perform materially better than the simple scheme described below, especially when the database B is constructed from a large number of loop configurations with very small granularity for loop lengths and bridge tap lengths.

One can employ a simpler estimation technique in which one known loop configuration closest to x is sought, which can be expressed as the following optimization problem:

$$\min_{r,\theta} \quad r^T W r + P\theta$$
$$\text{such that} \quad r = B\theta - x,$$
$$\theta = e_n.$$

with the same variables as the more general case, above, and n as an additional variable. Note that $e_n$ is simply a column vector of all 0's, except for the nth element which is 1. Thus, this optimization will look for the one column in B that best matches the observation x, and thus it is a restricted version of the more general case above in the sense that only $\theta = e_n$ is feasible.

To perform this simplified detection requires only computation of $r^T W r + P\theta$ for N possible θ ($\theta = e_n$, n=1, 2, ..., N), and thus no convex optimization routine such as an interior-point algorithm is required as in general QP problems. Obviously, if the database is extremely large, computation of $r^T W r + P\theta$ for each loop configuration will take more time than would be necessary for a smaller database. However, such methods can be executed with a database containing millions of loop configurations in under 1 second. Solution of this problem is very fast, non-iterative, and involves only computing the objective for each profile (each n) and then selecting the minimum.

It may also be desirable to detect "badly spliced" lines for corrective action by the operator. Such "badly spliced" lines generally can be identified because they are substantially inconsistent with entries in the loop configuration database, which is constructed in the absence of bad splices. In particular, badly spliced lines may be identified by their large, calculated residual values $\|r\|_m$ after finding the optimal solution θ, where an arbitrary m-metric is applied (for example, 1-norm, 2-norm, ∞-norm). In some cases, the metric can weight the upstream attenuation values more heavily than downstream values because the capacitive coupling of a bad splice is most dominant in the low frequency range where upstream transmissions occur. In some embodiments of the present invention, the residual values can be compared to threshold values. When the calculated residual value exceeds the threshold, a reasonable estimation can be made that a bad splice is present on the line.

Besides the residual error value, other operational data such as bit table, upstream and downstream attenuation values or upstream and downstream maximum attainable data rates can be used for detecting bad splices. Bad splices affect the channel characteristics as well as the echo characteristics (undesired interference signal at the receiver that originates from the transmit signal of the modem of interest; that is, an upstream transmit signal might smear into a downstream receiver for an ATU-R, and a downstream transmit signal might smear into an upstream receiver for an ATU-C) in a distinct manner that results in an effect on signal attenuation values and also echo in a low frequency band. Therefore, a relatively small number of bits is loaded and relatively high attenuation is reported in the low frequency region if there is a bad splice. If the channel estimation is based on the attenuation values, the relatively high attenuation values in low frequency band cause an over-estimation in loop length. Subsequently, the estimated Hlog and the noise spectrum are under-estimated in high frequency band, and a part of the estimated noise spectrum might go below a threshold that is considered to be reasonable. Such deviation also can be used for detecting bad splices. Basically, any collected operational data can be used to estimate a channel and noise spectrum curve for the DSL loop under consideration. The minimum value found in the estimated noise spectrum is compared to a threshold value (that defines the normal maximum noise for DSL modems if no bad splices are present). If the minimum value of the estimated noise curve varies sufficiently from the known limit, a bad splice likely is present.

Also, a bad splice might develop slowly, and attenuation values, maximum attainable data rates and bit distributions might vary significantly over time. In particular, attenuation values might slowly increase as a bad splice develops. If data collection is performed over an appropriate time period, time variations in data (such as increases in attenuation values) also can be used to detect bad splices.

Upon the detection of a bad splice, it is desirable to estimate the approximate location of the bad splice because the location information can reduce the effort required for corrective action. Such location estimation is often possible based on operational data and scanning. A bad splice can be modeled as a capacitor and it becomes a major reflector that increases the power level of an echo. If a bad splice is near an ATU-C, the echo that originates from the ATU-C's downstream transmit signal will be relatively larger at the upstream receiver of the ATU-C because the signal travels only a short length of loop before it is reflected by the bad splice and travels only a short distance before it is received in ATU-C's upstream receiver.

On the other hand, if a bad splice is near an ATU-R, the ATU-C's downstream transmit signal travels all the way down to the ATU-R side before it is reflected by the bad splice near the ATU-R side. In such a situation, the power level of echo will be relatively smaller at the upstream receiver of the ATU-C (in this case, the echo usually is smaller than other white noise and interferences, and does not affect upstream maximum attainable rates or bit distributions). Therefore, the location of a bad splice can be estimated by observing the shape and/or level of the noise spectrum and comparing them with the shape and/or level of an echo's spectrum. Moreover, the difference in bit loading can be observed for two line profiles with different downstream transmit power levels. In this case, a bad splice located near an ATU-C will make a larger difference than a bad splice located near an ATU-R. A similar method applies to the detection of a bad splice near an ATU-R.

Figure 15:
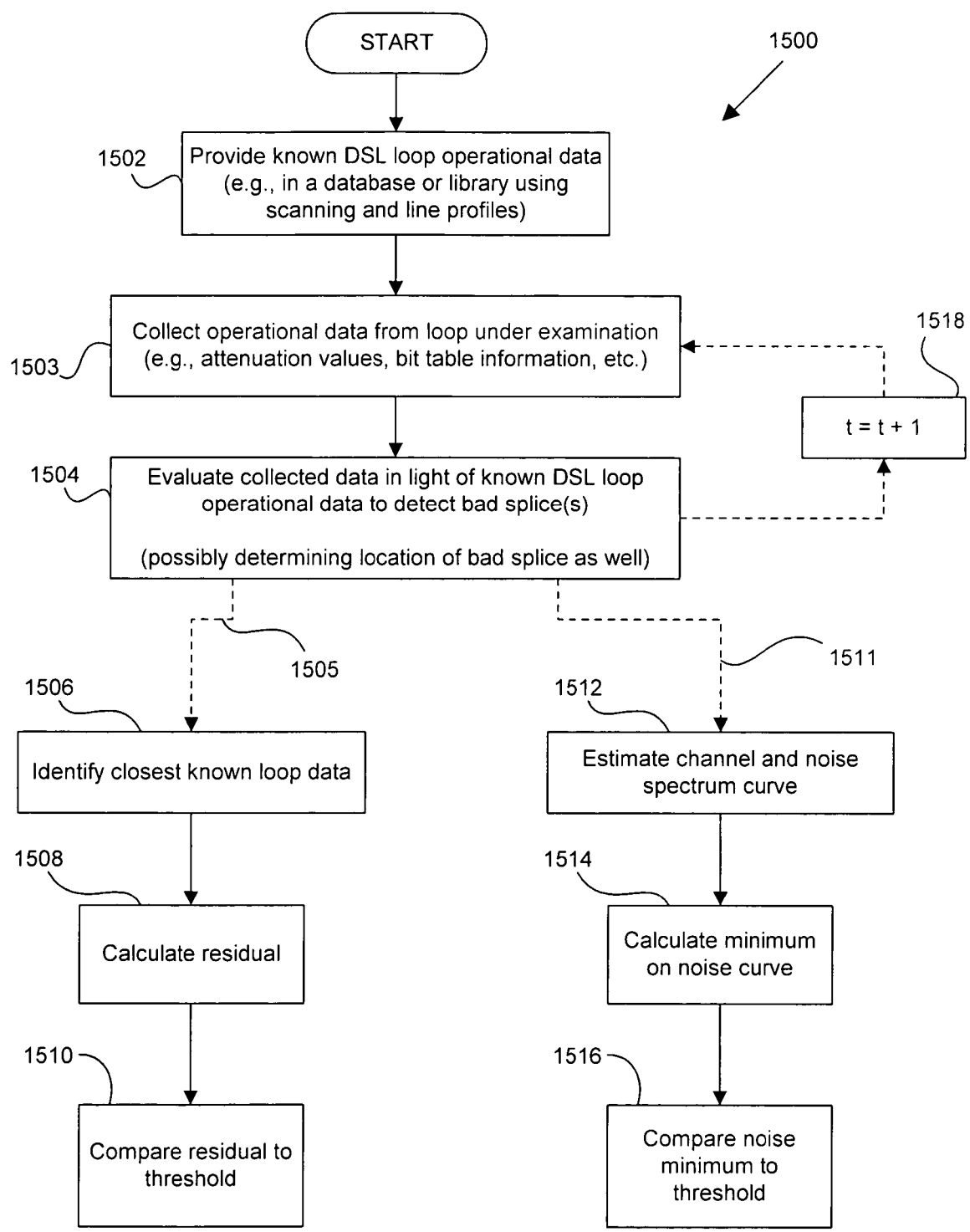
FIG. 15 is a flow diagram of methods according to one or more embodiments of the present invention usable in determining the presence and location of a bad splice in a communication line such as a DSL loop.

FIG. 15 illustrates several embodiments of the present invention relating to bad splice detection and location, as described above. Method 1500 begins at 1502 with providing known DSL loop data. At 1503 operational data (for example, of the type(s) discussed above) is collected from the DSL loop under examination. The collected data is evaluated at 1504 in light of the known DSL loop operational data to detect and possibly locate any bad splices on the line. One embodiment, via arrow 1505, then identifies the closest known loop data at 1506. A residual value is calculated at 1508, as discussed herein. Finally, at 1510 the residual value is compared to a threshold or limit to determine whether a bad splice in present. In an alternative embodiment, via arrow 1511, an estimate of the channel and noise spectrum curve is made at 1512. The minimum value on the noise curve is calculated at 1514 and then compared at 1516 to a threshold or cutoff that will likely indicate whether a bad splice is present on the line. As indicated by counter 1518, the collection and evaluation may progress over a period of time to determine whether there is line degradation due to a developing bad splice.

The performance of these more general channel identification methods typically depends intrinsically on the choice of line profiles employed for data collection and the behavior of the ATU-R modem that is being used for operation. Different modems perform differently with the same line parameters. So, for example, given a specific loop configuration, a first modem type might give very different results (operational data such as attenuation values) when scans are run with no bridged taps and with a 500 ft bridged tap. However, a second modem type might return similar data in both cases. Thus performance may depend in some cases on the modem type. Different line profiles afford the methods according to the present invention more degrees of freedom (that is, more differences among the reported parameters for the different scans) to analyze, while similar line profiles often provide essentially redundant information. Too many different line parameters to be estimated coupled with insufficient degrees of freedom can lead to fundamental constraints on the performance of the estimation routines. Stated another way, using too many distinct line profiles may yield more data than can be analyzed effectively and/or economically (possibly bogging down the evaluation), while using too few sufficiently distinct line profiles may mean insufficient data is available for analysis.

As will be appreciated by those skilled in the art, dynamic spectrum scanning may be implemented by first collecting the attenuation information for each modem from all profiles. Channel identification based on a subset of these profiles can be performed by deleting rows from the matrix B, above. In one embodiment of the present invention, a first round of tests can be performed, starting with a standard set of tests run on all modems initially, followed by a specialized set of tests that depend on the identified modem type or one or more rough estimations of loop configuration. A second round of tests can then be executed if the first round is inconclusive or a higher level of certainty in the results is desired. As mentioned above, the choice of W plays a role in performance, but it is observed to be a second-order effect as compared to the characteristics of the line profiles used for scanning.

Another embodiment of the present invention utilizes additional operational data beyond the ASM data that might be available. For some modems, for example, supplemental operational data, such as insertion loss information or data, is available along with the ASM data. In such cases, channel identification differs fundamentally from the situation in which ASM data alone (that does not include insertion loss) is available. Instead of basing identification primarily on attenuation values, the insertion loss reported by the modem is employed. First, the multiple reported channel attenuation values are averaged together on a logarithmic scale. The averaging operations smooth transient interference (which can affect estimation performance) and insertion loss measuring error.

When modems have an insertion loss bias (relative to ABCD models), this effect can be cancelled by shifting the whole reported insertion loss by a constant dB, as will be easily understood by those skilled in the art. After shifting, the reported insertion loss is compared to the theoretical (ABCD) values for numerous line configuration candidates.

Figure 11:
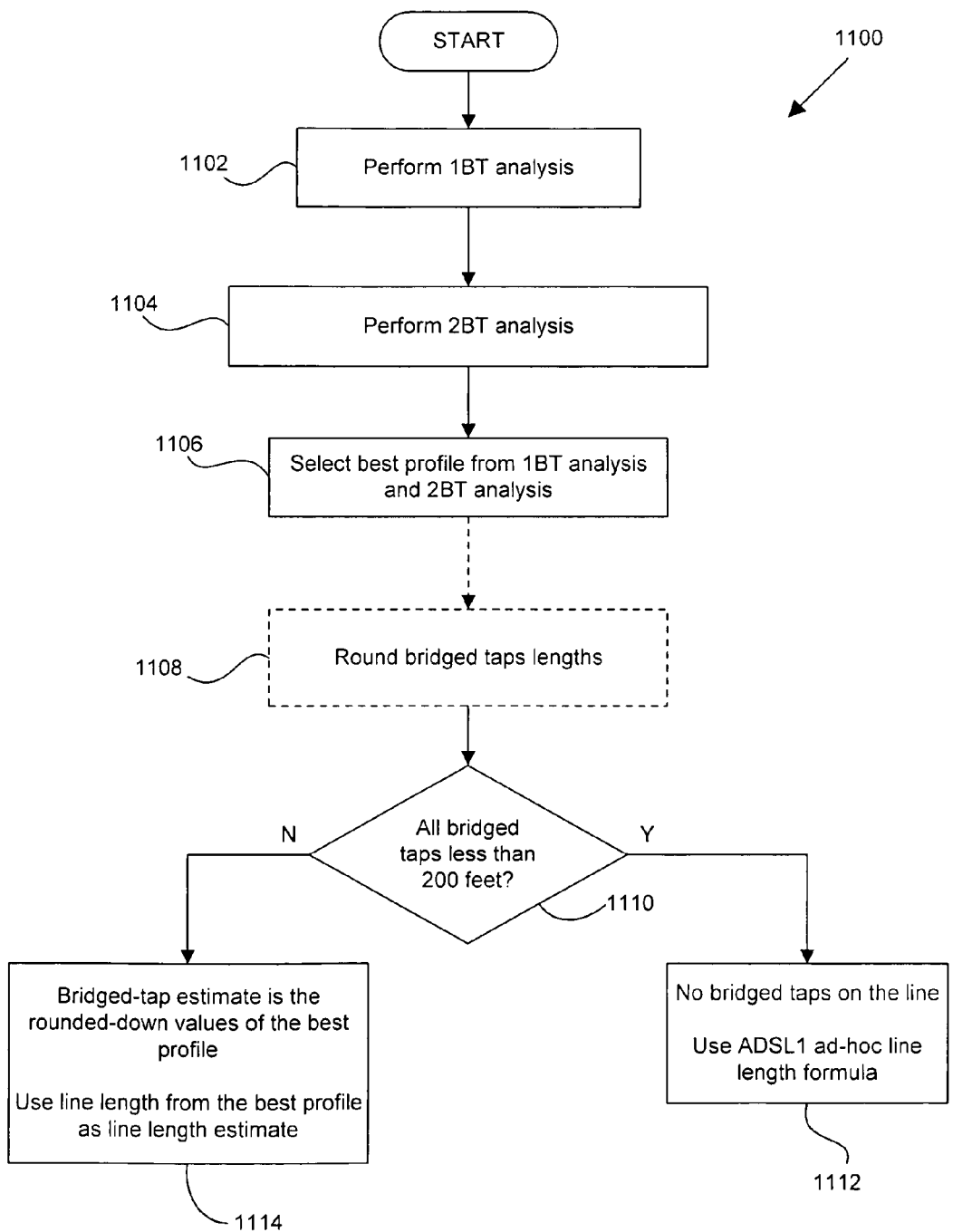
FIG. 11 is a flow diagram of a method according to one or more embodiments of the present invention in which an unknown DSL loop configuration is estimated and in which channel insertion loss information is known.

When channel insertion loss is known, another embodiment of the present invention can be utilized, as illustrated in FIG. 11. According to the method 1100 of FIG. 11, the channel identification process begins by conducting a rough bridged tap (BT) analysis considering 0 bridged taps or 1 bridged tap (a "1BT analysis") at 1102. As part of the 1BT analysis, a rough sampling of line lengths and BT parameters is performed, yielding a set of 1BT first round (or 1BT-1) profiles. The S 1BT-1 profiles that are closest to the averaged and shifted insertion loss (where, for example, S is 20) are forwarded to a second round while the remainders are discarded. Here, the measure of closeness can be the difference metric $d_{TOTAL}$, described below. For each of these S profiles, loop profiles close to the 1BT-1 profiles then are constructed with a fine sampling of line lengths and BT parameters. The aggregate of these new profiles can be called the 1BT second round (or 1BT-2) profiles. For each 1BT-2 profile, the difference metric is computed as before to find the 1BT-2 profile minimizing the metric.

At 1104 an analysis considering 2 bridged taps is performed using a rough sampling of 2 bridged tap configurations analogous to the 1 BT analysis 1102. Using the same difference metric $d_{TOTAL}$, the S profiles closest to the average and shifted insertion loss are found and forwarded to the next round as the 2BT first round (or 2BT-1) candidates. For each of these S profiles, a number of loop profiles called 2BT-2 candidates are constructed that are close to the 2BT-1 candidates. Again, the profile minimizing the difference metric is found.

At 1106 the best profile (for example, the profile with the smallest difference metric) of the 1BT-2 and 2BT-2 profiles is selected as the best profile. A controller, such as a DSM Center DSL optimizer, could then return the loop length and the BT lengths of the best profile as the output of channel estimation. Alternatively, the channel insertion loss that can be calculated using the ABCD model and the best profile can be returned as the estimate of the channel. However, in some cases it may be preferable as a final step at 1108 to round down all the bridged taps' lengths of 200 feet or less in the best profile to 0 feet because the small bridge tap lengths might be the result of a small estimation error. A decision 1110 then can be made as to bridged taps. If all the bridged taps for the best profile are less than 200 feet, it can be estimated at 1112 that there are no bridged taps on the line, and the following ADSL1 ad-hoc line length formula for upstream attenuation to formulate the estimated line length can be used:

$$\text{loop length} = \frac{1}{3}\overline{USatten} - \frac{2}{3} \quad \text{for } \overline{USatten} \geq 11$$

$$\text{loop length} = \frac{3}{11}\overline{USatten} \quad \text{for } \overline{USatten} < 11$$

where, the result is in kilofeet and $\overline{USatten}$ is the average upstream attenuation collected for normal operational line profiles without carrier mask constraints. Otherwise, at 1114 the bridged-tap estimate is the rounded-down value of the best profile and the line length estimate the line length of the best profile.

The reason for the rounding down in step 1108 is that a short bridged tap frequently may be misidentified on lines that do not have any short bridged taps. This fact also means that the channel identification routines for such modems are unable to detect very short bridged taps. The above ADSL1 ad-hoc line length formula was originally calibrated for use on lines with no bridged taps, so it is marginally more accurate as an estimate for line length on such lines than using the line length of the best profile. Also, it is conservative in the sense that it guarantees that the disclosed technique performs no worse than the entrenched ADSL1 ad-hoc line length technique on the important special case of lines with no bridged taps. Thus this step replaces the ABCD estimate with the ADSL1 ad-hoc line length formula estimate for such cases.

$d_{TOTAL}$ is defined to determine which profiles are close to the observed insertion loss and provides an objective, numerical quantification of the difference between the theoretical and observed insertion losses. Selection of $d_{TOTAL}$ is motivated by several physical effects. The simplest measure might simply be the mean squared error between the observed (and bias adjusted) insertion loss $H_{IL}$ and the theoretical values for the insertion loss $H_{ABCD}$:

$$d_{MSE}(H_{ABCD}, H_{IL}) = \sum_n \|H_{IL,n} - H_{ABCD,n}\|^2$$

Figure 13A:
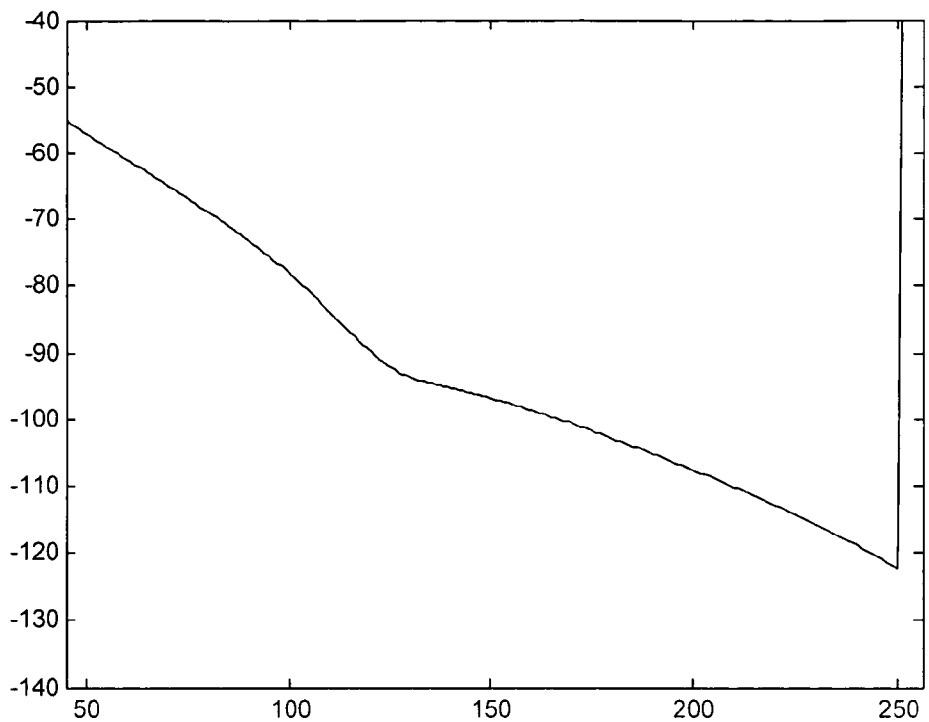
FIG. 13A is a pair of graphical depictions of an Hlog model and/or estimate using an ABCD methodology and a reported insertion loss for a DSL channel.
Figure 13A:
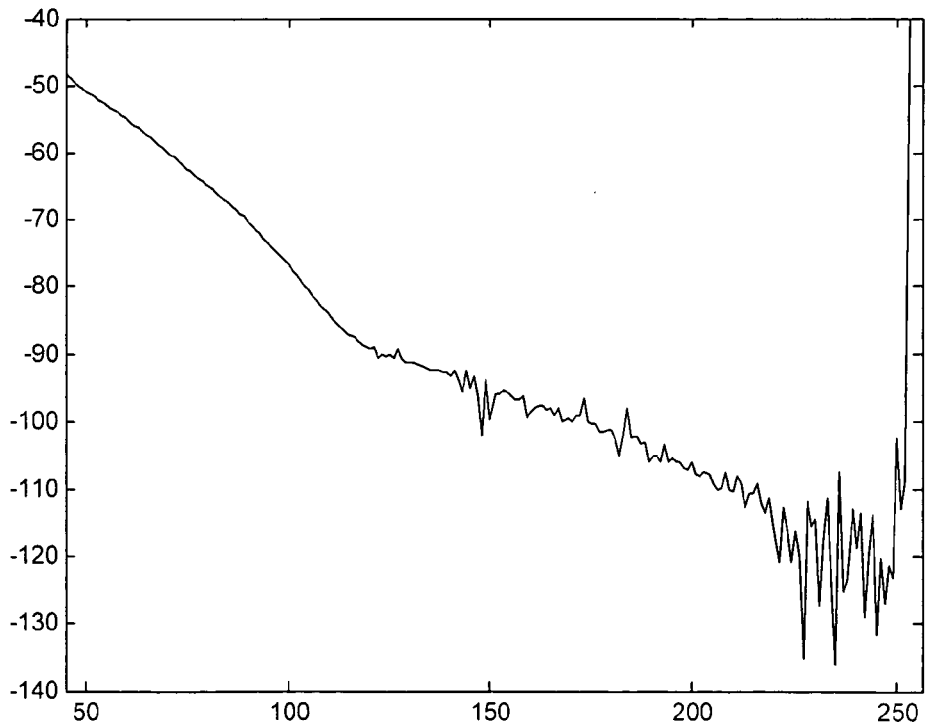

However, such a metric suffers from certain problems. First, insertion loss reported for low-frequencies might deviate from a theoretical channel model due to the analog filter that is employed by the modem. Moreover, the insertion loss for high-frequencies might contain error due to modem internal measurement error which is the result of the high attenuation of the channel (typically above 100 dB). For instance, 1304 of FIG. 13A shows noisy channel measurements for tones above 130. The variance among the insertion loss values reported by a modem in a high-frequency range can be very high when channel attenuation is very high. There also can be peaks and valleys in the low-frequency region (less than 100 dB attenuation) due to noise effects, though this might not be expected in theory. Minimizing the error in high-variance bands is less important than minimizing the error in the lower-variance bands. Also, it is preferable to ignore small peaks and/or valleys in the low-variance band. However, the notion of MSE as a criterion for difference is nevertheless useful.

Figure 12:
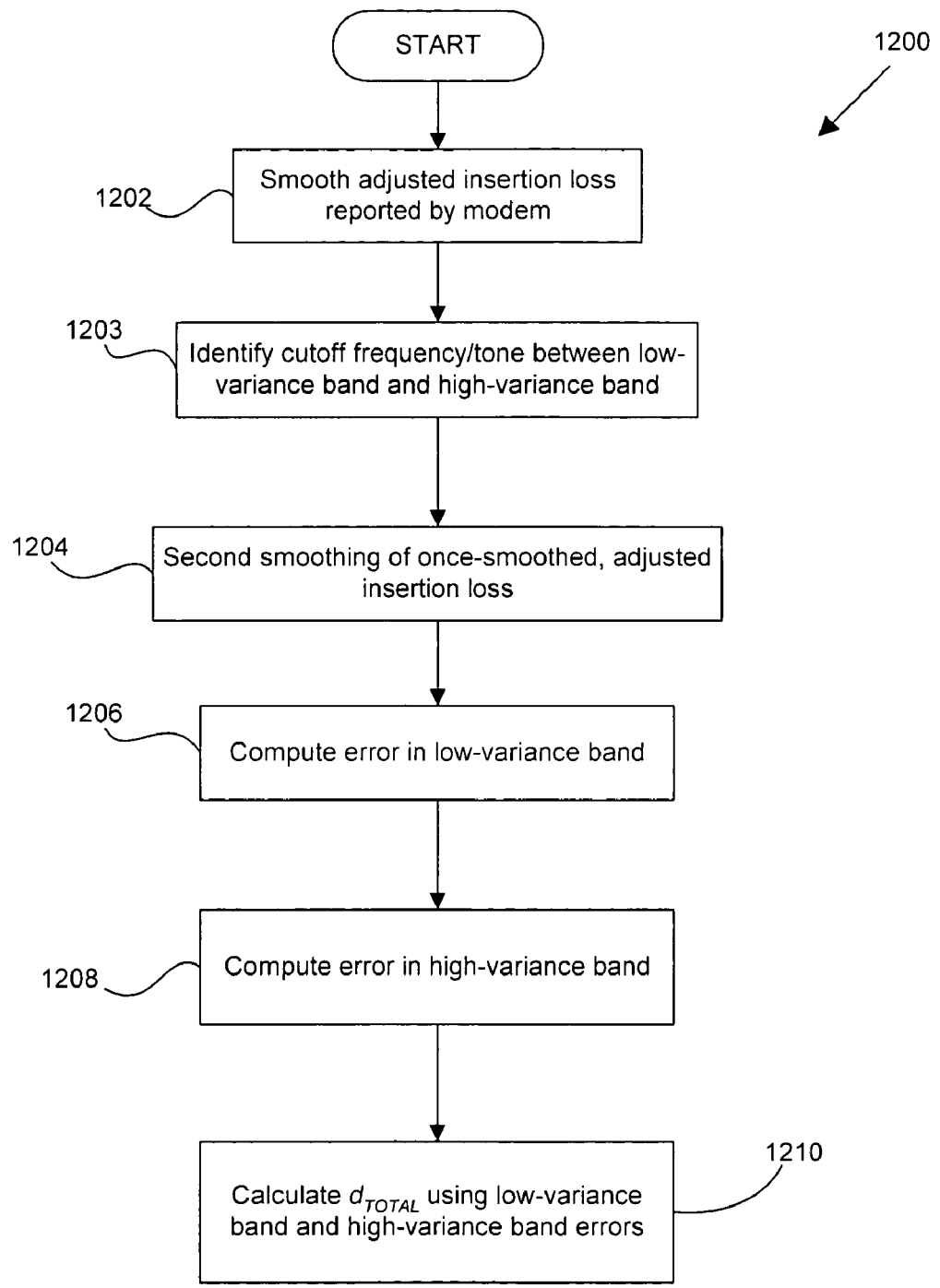
FIG. 12 is a flow diagram of methods according to one or more embodiments of the present invention usable in determining a difference metric usable with the present invention.

The method 1200 of FIG. 12 takes these issues into consideration. At 1202 the averaged and bias-adjusted insertion loss reported by the modem are smoothed out by using a simple sliding-window median filter. The result is called $H_{smooth}$. The first few tones in the downstream band of $H_{smooth}$ are ignored to avoid any analog effects from the modem, as well as to avoid windowing effects induced by the smoothing filter. As the insertion loss is generally decreasing in frequency, at 1203 the point is identified at which $H_{smooth}$ first dips below −100 dB. This cutoff point is called $f_{cut}$. Tones less than $f_{cut}$ are the "low-variance" band and tones higher than $f_{cut}$ are the "high-variance" band.

At 1204 another smoothing is performed on $H_{smooth}$ such that the variance in the high-variance region is smoothed out further. The result of this second smoothing is called $H_{verysmooth}$. The error in the low-variance band, $MSE_{low}$, is computed at 1206 as:

$$MSE_{low} = \sum_{n=c}^{f_c} \|H_{ABCD,n} - H_{smooth,n}\|^2$$

(where $f_c$ is $f_{cut}$)

The c lowest tones are disregarded in this embodiment to account for modem error effects for lower tones.

After discarding the c' total upper tones to account for windowing effects from the filtering operations, the error in this high-variance band, $MSE_{high}$, is computed at 1208 as:

$$MSE_{high} = \frac{1}{4} \sum_{n=f_c}^{256-c'} \|H_{ABCD,n} - H_{verysmooth,n}\|^2 \text{ (again, where } f_c \text{ is } f_{cut}\text{)}$$

The error in the high-variance band is weighted less than that of the low-variance band. Finally, at 1210 the total difference metric $d_{TOTAL}$ is calculated as:

$$d_{TOTAL} = MSE_{low} + MSE_{high}$$

Where, as in the immediately preceding example, the database methodology is not applied for channel identification, the technique described earlier for detecting bad splices through attenuation residuals is not applicable. However, bad splices can be detected based on a property of such connections—high attenuation at low frequencies due to capacitive coupling. Thus, by examining the error between the ABCD model and reported attenuation, bad splices can be detected by looking for large errors with higher than expected attenuation at low frequencies, and lower than expected attenuation at high frequencies. Furthermore, the shape of insertion loss can be used to detect the location of bad splice whenever the insertion loss is a function of bad splice's location.

Figure 13B:
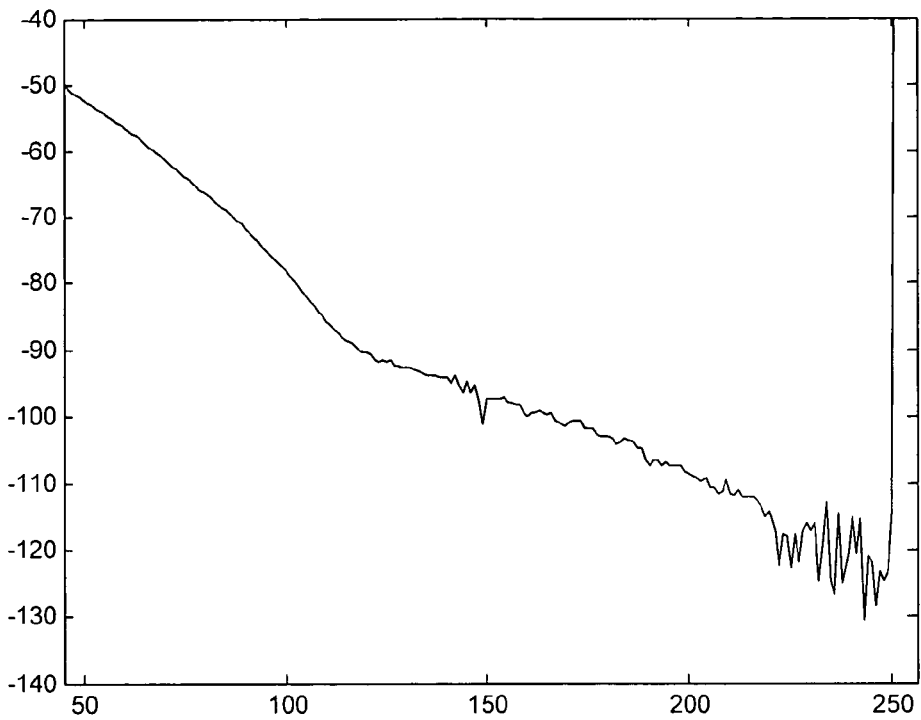
FIG. 13B is a pair of graphical depictions of a first smoothing of the reported insertion loss of FIG. 13A and a subsequent smoothing of the first smoothing, consistent with the method of FIG. 12.
Figure 13B:
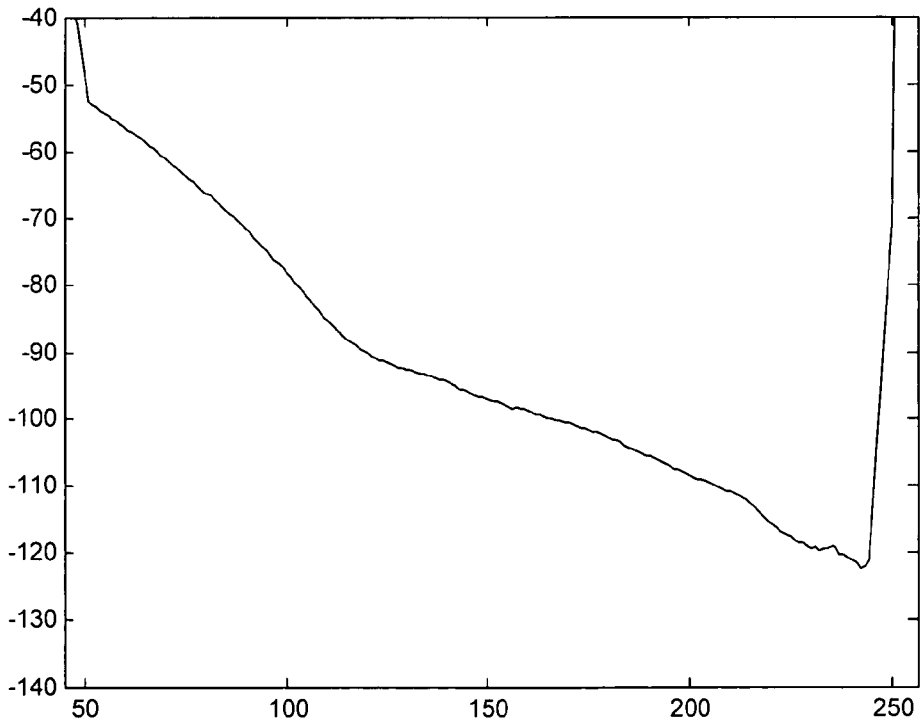

An example of a channel identification procedure according to one or more embodiments of the present invention is illustrated in the graphs of FIGS. 13A and 13B, which show sample data graphs. In FIG. 13A, the Hlog estimates (per an ABCD model) are shown in graph 1302. The actual (reported) insertion loss 1304 of a loop also is shown in FIG. 13A.

In FIG. 13B, $H_{smooth}$ is depicted in graph 1306, while $H_{verysmooth}$ is shown as graph 1308. The high-variance band is used for ADSL tones above approximately tone 150, which is approximately where the plot dips below −100 dB. The smoothed reported channel insertion losses have some edge effects (rounding) at high and low tones. Also, the fast jumps in $H_{smooth}$ at high frequencies show error introduced by the modem. Although the ABCD model does not match the reported insertion loss exactly, the overall shape of the match is reasonable. The reported insertion loss 1304 has even more noise than $H_{smooth}$, as expected.

The characteristics of error in reported insertion loss might be dependent on modem type. This is because a modem's internal measurement error is a function of various modem design factors. In such cases, modem identification using techniques found, for example, in U.S. Ser. No. 10/981,068 filed on Nov. 4, 2004, entitled COMMUNICATION DEVICE IDENTIFICATION and owned by Adaptive Spectrum And Signal Alignment, Inc. of Redwood City, Calif., the disclosure of which is incorporated herein by reference in its entirety for all purposes, can be used first to identify the modem type such that the channel estimation algorithm can be adaptively adjusted for each modem type.

Generally, embodiments of the present invention employ various processes involving data stored in or transferred through one or more computer systems. Embodiments of the present invention also relate to a hardware device or other apparatus for performing these operations. This apparatus may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the required method steps. A particular structure for a variety of these machines will be apparent to those of ordinary skill in the art based on the description given below.

Embodiments of the present invention as described above employ various process steps involving data stored in computer systems. These steps are those requiring physical manipulation of physical quantities. Usually, though not necessarily, these quantities take the form of electrical or magnetic signals capable of being stored, transferred, combined, compared and otherwise manipulated. It is sometimes convenient, principally for reasons of common usage, to refer to these signals as bits, bitstreams, data signals, control signals, values, elements, variables, characters, data structures or the like. It should be remembered, however, that all of these and similar terms are to be associated with the appropriate physical quantities and are merely convenient labels applied to these quantities.

Further, the manipulations performed are often referred to in terms such as identifying, fitting or comparing. In any of the operations described herein that form part of the present invention these operations are machine operations. Useful machines for performing the operations of embodiments of the present invention include general purpose digital computers or other similar devices. In all cases, there should be borne in mind the distinction between the method of operations in operating a computer and the method of computation itself. Embodiments of the present invention relate to method steps for operating a computer in processing electrical or other physical signals to generate other desired physical signals.

Embodiments of the present invention also relate to an apparatus for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given above.

In addition, embodiments of the present invention further relate to computer readable media that include program instructions for performing various computer-implemented operations. The media and program instructions may be those specially designed and constructed for the purposes of the present invention, or they may be of the kind well known and available to those having skill in the computer software arts. Examples of computer-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 8:
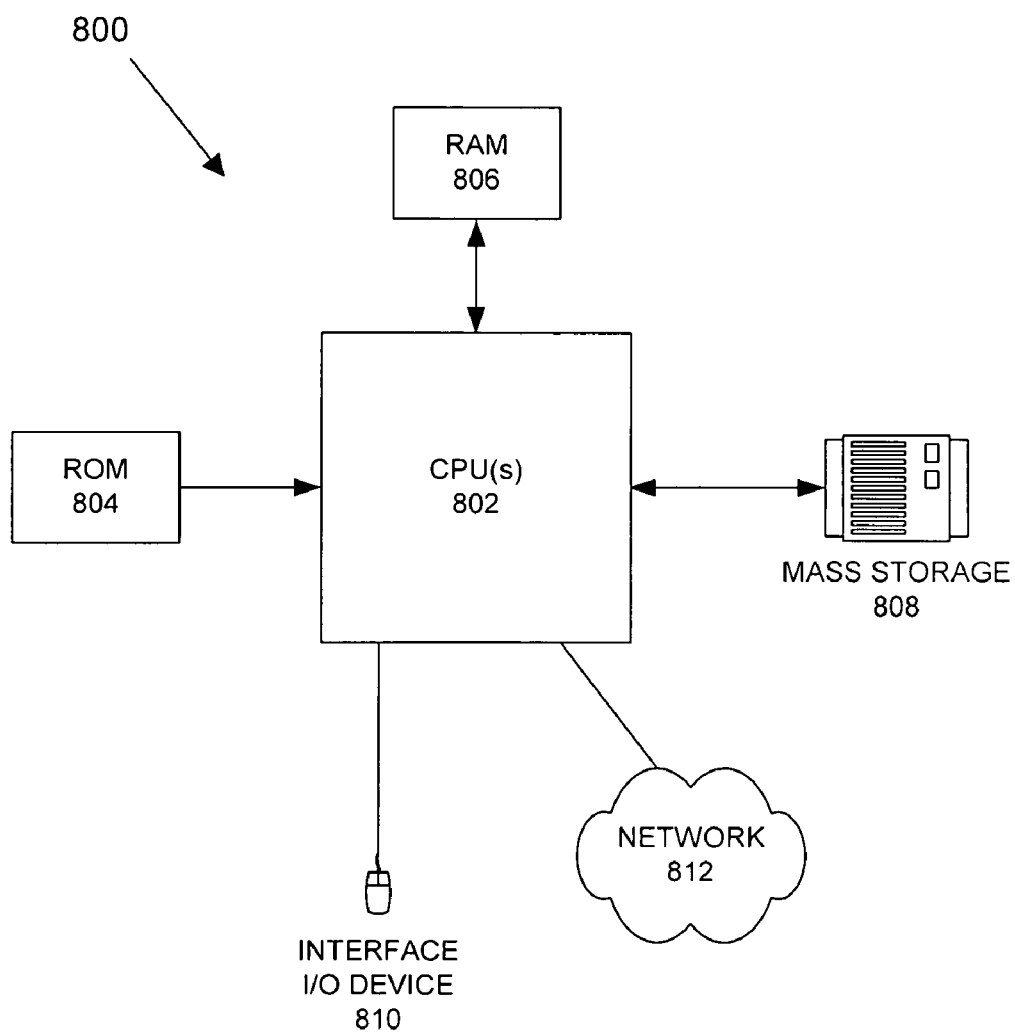
FIG. 8 is a block diagram of a typical computer system or integrated circuit system suitable for implementing embodiments of the present invention.
Figure 9:
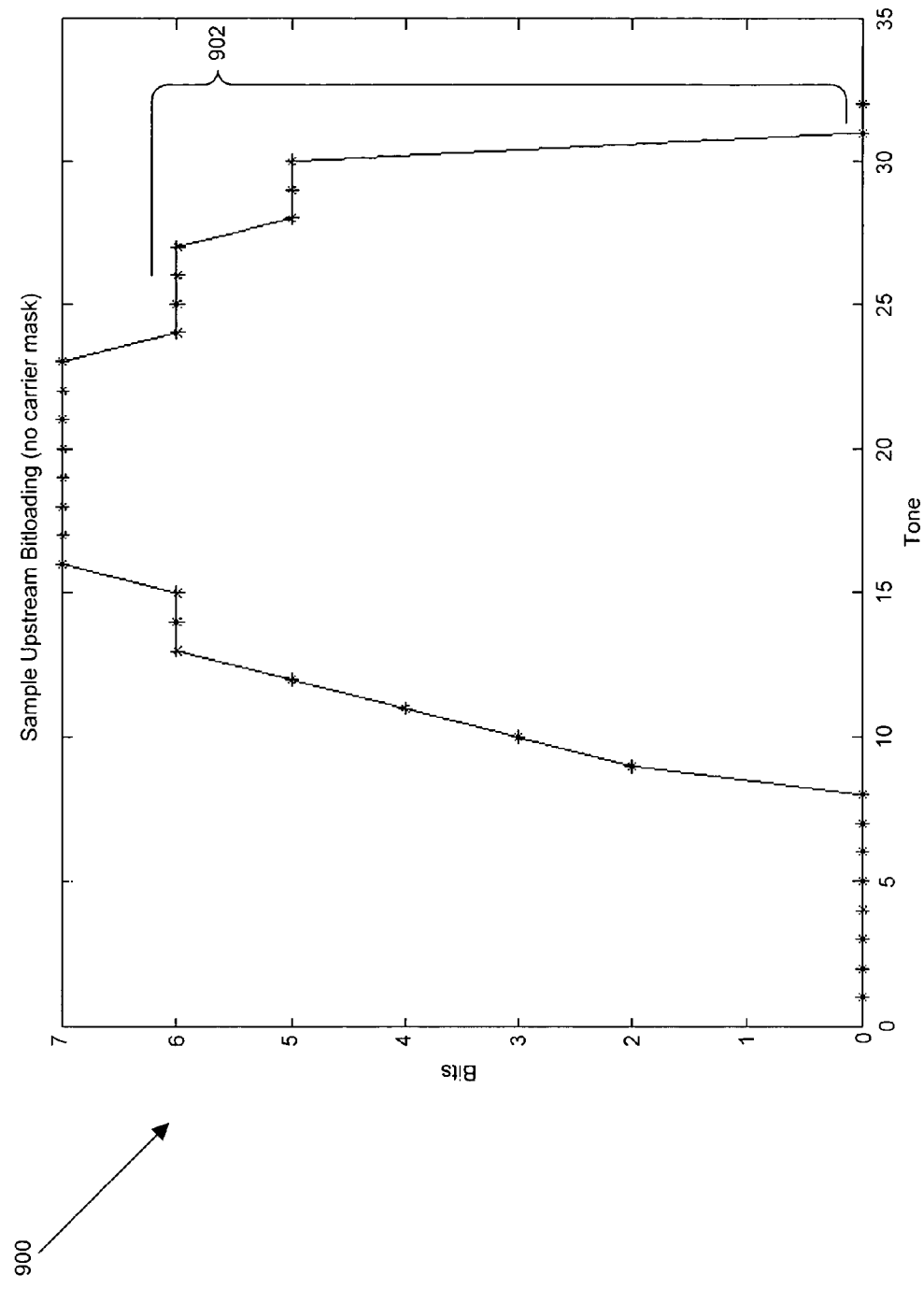
FIG. 9 is a representative 1.536 Mbps lab profile showing upstream bitloading.

FIG. 8 illustrates a typical computer system that can be used by a user and/or controller in accordance with one or more embodiments of the present invention. The computer system 800 includes any number of processors 802 (also referred to as central processing units, or CPUs) that are coupled to storage devices including primary storage 806 (typically a random access memory, or RAM), primary storage 804 (typically a read only memory, or ROM). As is well known in the art, primary storage 804 acts to transfer data and instructions uni-directionally to the CPU and primary storage 806 is used typically to transfer data and instructions in a bi-directional manner. Both of these primary storage devices may include any suitable of the computer-readable media described above. A mass storage device 808 also is coupled bi-directionally to CPU 802 and provides additional data storage capacity and may include any of the computer-readable media described above. The mass storage device 808 may be used to store programs, data and the like and is typically a secondary storage medium such as a hard disk that is slower than primary storage. It will be appreciated that the information retained within the mass storage device 808, may, in appropriate cases, be incorporated in standard fashion as part of primary storage 806 as virtual memory. A specific mass storage device such as a CD-ROM 814 may also pass data uni-directionally to the CPU.

CPU 802 also is coupled to an interface 810 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 802 optionally may be coupled to a computer or telecommunications network using a network connection as shown generally at 812. With such a network connection, it is contemplated that the CPU might receive information from the network, or might output information to the network in the course of performing the above-described method steps. The above-described devices and materials will be familiar to those of skill in the computer hardware and software arts. The hardware elements described above may define multiple software modules for performing the operations of this invention. For example, instructions for running a codeword composition controller may be stored on mass storage device 808 or 814 and executed on CPU 802 in conjunction with primary memory 806. In a preferred embodiment, the controller is divided into software submodules.

The many features and advantages of the present invention are apparent from the written description, and thus, the appended claims are intended to cover all such features and advantages of the invention. Further, since numerous modifications and changes will readily occur to those skilled in the art, the present invention is not limited to the exact construction and operation as illustrated and described. Therefore, the described embodiments should be taken as illustrative and not restrictive, and the invention should not be limited to the details given herein but should be defined by the following claims and their full scope of equivalents, whether foreseeable or unforeseeable now or in the future.

What is claimed is:

1. A method of estimating the configuration of an unknown DSL loop, the method comprising:
   (1) providing a database comprising loop configuration information and known loop operational data for one or more known DSL loop configurations, wherein providing the database further comprises:
      sending data on a known DSL loop having a known loop configuration using a plurality of line profiles, wherein for each of the plurality of line profiles data is sent between a transceiver pair comprising an active DSL modem at each end of the known loop; and
      collecting the known loop operational data resulting from the data sent on the known DSL loop having the known configuration;
   (2) collecting unknown loop operational data from the unknown DSL loop using one or more known line profiles, wherein the unknown loop operational data is a result of transmissions between a transceiver pair, the transceiver pair comprising an active DSL modem at each end of the unknown DSL loop;
   (3) estimating the configuration of the unknown DSL loop by comparing the collected unknown loop operational data to the known loop operational data in the database.

2. The method of claim 1 wherein the collected known loop operational data and collected unknown loop operational data comprise attenuation values.

3. The method of claim 1 wherein the known line profiles comprise combinations of control information.

4. The method of claim 3 wherein the control information includes one or more of the following:
   (1) data rate;
   (2) transmit power;
   (3) PSD;
   (4) carrier mask information;
   (5) FEC settings;
   (6) INP settings;
   (7) DELAY settings;
   (8) target SNR margin settings; or
   (9) maximum SNR margin settings.

5. The method of claim 1 wherein collecting unknown loop operational data from the unknown DSL loop using one or more known line profiles comprises performing a plurality of collections of unknown loop operational data from the unknown DSL loop.

6. The method of claim 1 wherein estimating the configuration of the unknown DSL loop by comparing the collected unknown loop operational data to the known loop operational data in the database comprises looking for an exact match between the collected unknown loop operational data and the known loop operational data for one of the known DSL loop configurations in the database.

7. The method of claim 1 wherein estimating the configuration of the unknown DSL loop by comparing the collected unknown loop operational data to the known loop operational data in the database comprises matching:
   the collected unknown loop operational data and
   an interpolation of the known loop operational data of two or more of the known DSL loop configurations in the database.

8. The method of claim 1 wherein estimating the configuration of the unknown DSL loop by comparing the collected unknown loop operational data to the known loop operational data in the database comprises matching:
   the collected operational data and
   the closest known loop operational data of one of the known DSL loop configurations in the database.

9. The method of claim 1 wherein estimating the configuration of the unknown DSL loop by comparing the collected unknown loop operational data to the known loop operational data in the database comprises constructing a weighting of the known loop operational data of one or more of the known DSL loop configurations in the database.

10. The method of claim 1 wherein providing the database comprising loop configuration information and known loop operational data for one or more known DSL loop configurations comprises collecting operational data from the known DSL loop configurations by running a plurality of the known line profiles on the known DSL loops to generate the collected known loop operational data;

further wherein estimating the configuration of the unknown DSL loop by comparing the collected unknown loop operational data to the known loop operational data in the database comprises emphasizing one or more of the known line profiles used to generate the known loop operational data for one or more of the known DSL loop configurations.

11. The method of claim 1 wherein providing the database comprising loop configuration information and known loop operational data for one or more known DSL loop configurations comprises collecting operational data from the known DSL loop configurations by running a plurality of the known line profiles on the known DSL loops to generate the collected known loop operational data;

further wherein estimating the configuration of the unknown DSL loop by comparing the collected unknown loop operational data to the known loop operational data in the database comprises emphasizing one or more of the known DSL loop configurations based on the likelihood that a given known DSL loop is similar to the unknown DSL loop configuration.

12. The method of claim 1 wherein the collected unknown loop operational data is operational data reported by an MIB.

13. The method of claim 12 wherein the operational data reported by the MIB comprises attenuation values for the unknown DSL loop.

14. The method of claim 1 wherein the method for estimating the DSL loop configuration of the unknown DSL loop further comprises:

sending data on the unknown DSL loop using one or more of the plurality of line profiles;

collecting operational data from the unknown DSL loop;

comparing the collected operational data from the unknown DSL loop to the database; and estimating the loop configuration of the unknown DSL loop based on the comparison.

15. The method of claim 14 wherein the collected data from the known DSL loop comprises attenuation values and further wherein the collected data from the unknown DSL loop comprises attenuation values.

* * * * *